United States Patent
Sung et al.

(10) Patent No.: US 11,580,617 B2
(45) Date of Patent: Feb. 14, 2023

(54) METHOD OF MATCHING IMAGES TO BE MERGED AND DATA PROCESSING DEVICE PERFORMING THE SAME

(71) Applicant: SAMSUNG ELECTRONICS CO., LTD., Suwon-si (KR)

(72) Inventors: Changhun Sung, Yongin-si (KR); Deokhwan Kim, Pyeongtaek-si (KR); Byungdeok Kim, Yongin-si (KR); Taeui Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/204,434

(22) Filed: Mar. 17, 2021

(65) Prior Publication Data

US 2022/0004799 A1 Jan. 6, 2022

(30) Foreign Application Priority Data

Jul. 3, 2020 (KR) ........................ 10-2020-0082313

(51) Int. Cl.
*G06V 10/46* (2022.01)
*G06T 3/40* (2006.01)
*G06V 10/44* (2022.01)

(52) U.S. Cl.
CPC .......... *G06T 3/4038* (2013.01); *G06V 10/443* (2022.01)

(58) Field of Classification Search
CPC .. G06V 10/462; G06V 10/443; G06T 3/4038; G06T 7/00
See application file for complete search history.

(56) References Cited

U.S. PATENT DOCUMENTS 8,027,514 B2  9/2011  Takaki et al.
8,385,732 B2  2/2013  Zuniga et al.
(Continued)

FOREIGN PATENT DOCUMENTS

CN   106530214 A  *  3/2017  ........... G06T 3/0068
CN   106204422 B  *  6/2019  ........... G06T 3/0068
(Continued)

OTHER PUBLICATIONS

Cao, M., Jia, W., Lv, Z., Zheng, L. and Liu, X., 2019. Superpixel-Based Feature Tracking for Structure from Motion. Applied Sciences, 9(15), p. 2961.*

*Primary Examiner* — Zhitong Chen
(74) *Attorney, Agent, or Firm* — F. Chau & Associates, LLC

(57) ABSTRACT

Each input image from a plurality of input images is divided into a plurality of image tiles. A feature point map including a plurality of feature point tiles respectively corresponding to the plurality of image tiles is generated by extracting feature points included in each image tile of the plurality of image tiles. A descriptor map including a plurality of descriptor tiles respectively corresponding to the plurality of feature point tiles is generated by generating descriptors of feature points included in the feature point map. Mapping information containing matching relationships between feature points included in different input images of the plurality of input images is generated based on a plurality of descriptor maps respectively corresponding to the plurality of input images. Image merging performance may be enhanced by dividing the input image into the plurality of image tiles to increase distribution uniformity of the feature points.

19 Claims, 28 Drawing Sheets

(56) References Cited

U.S. PATENT DOCUMENTS

| | | |
|---|---|---|
| 8,553,980 B2 | 10/2013 | Ahn et al. |
| 8,723,978 B2 | 5/2014 | Kwon et al. |
| 9,020,187 B2 | 4/2015 | Pirchheim |
| 9,082,008 B2 | 7/2015 | Ma et al. |
| 9,761,008 B2 | 9/2017 | Cleveland et al. |
| 9,779,509 B2 | 10/2017 | Martini |
| 2008/0247651 A1* | 10/2008 | Takaki ................ G06V 10/462 382/219 |
| 2019/0205693 A1 | 7/2019 | Zhu et al. |
| 2020/0302584 A1* | 9/2020 | Zhang .................... G06T 7/001 |

FOREIGN PATENT DOCUMENTS

| | | |
|---|---|---|
| KR | 10-1256194 | 4/2013 |
| KR | 10-1633893 | 6/2016 |

\* cited by examiner

FIG. 11

| $I_0$ | $I_1$ | $I_2$ | $I_3$ | $I_4$ |
|---|---|---|---|---|
| $X_{01}$ | | $X_{21}$ | $X_{31}$ | |
| $X_{02}$ | $X_{11}$ | $X_{22}$ | $X_{32}$ | |
| $X_{03}$ | | $X_{23}$ | | $X_{41}$ |
| | $X_{12}$ | $X_{24}$ | | $X_{42}$ |
| | $X_{13}$ | $X_{25}$ | $X_{33}$ | $X_{43}$ |
| $X_{04}$ | $X_{14}$ | $X_{26}$ | $X_{34}$ | |
| $X_{05}$ | | $X_{27}$ | $X_{35}$ | $X_{44}$ |

MINF

FIG. 24

$$\begin{bmatrix} h_1 & h_2 & h_3 \\ h_4 & h_5 & h_6 \\ h_7 & h_8 & h_9 \end{bmatrix} \begin{bmatrix} u \\ v \\ 1 \end{bmatrix} = \begin{bmatrix} u' \\ v' \\ 1 \end{bmatrix} \Leftrightarrow \begin{Bmatrix} uh_1 + vh_2 + h_3 = u' \\ uh_4 + vh_5 + h_6 = v' \\ uh_7 + vh_8 + h_9 = 1 \end{Bmatrix} \Leftrightarrow HX = X'$$

$$\begin{bmatrix} 0 & 0 & 0 & -u & -v & -1 & v'u & v'v & v' \\ u & v & 1 & 0 & 0 & 0 & -u'u & -u'v & -u' \\ -v'u & -v'v & -v' & u'u & u'v & u' & 0 & 0 & 0 \end{bmatrix} \begin{bmatrix} h_1 \\ h_2 \\ h_3 \\ h_4 \\ h_5 \\ h_6 \\ h_7 \\ h_8 \\ h_9 \end{bmatrix} = \begin{bmatrix} 0 \\ 0 \\ 0 \end{bmatrix} \Leftrightarrow Ah = 0$$

METHOD OF MATCHING IMAGES TO BE MERGED AND DATA PROCESSING DEVICE PERFORMING THE SAME

CROSS-REFERENCE TO RELATED APPLICATION

This U.S. non-provisional application claims priority under 35 USC § 119 to Korean Patent Application No. 10-2020-0082313, filed on Jul. 3, 2020, in the Korean Intellectual Property Office (KIPO), the disclosure of which is incorporated by reference herein in its entirety.

TECHNICAL FIELD

Example embodiments relate generally to semiconductor integrated circuits, and more particularly to a method of matching images to be merged and data processing device performing the method.

DISCUSSION OF THE RELATED ART

In the field of computer vision, images are merged using corresponding points between the images. The merged image may be applied to various image processing techniques, such as image stitching, noise reduction, dynamic range conversion, and others. To merge images, an image matching process may obtain mapping relationships between feature points in a plurality of images to be merged. Such image matching requires a large amount of processing and the quality of a merged image may depend on the performance of the image matching process.

SUMMARY

Some example embodiments may provide a method of matching images and a data processing device, capable of efficiently matching and merging images.

In a method of matching images according to example embodiments, each input image of a plurality of input images is divided into a plurality of image tiles. A feature point map including a plurality of feature point tiles respectively corresponding to the plurality of image tiles is generated by extracting feature points included in each image tile of the plurality of image tiles. A descriptor map including a plurality of descriptor tiles respectively corresponding to the plurality of feature point tiles is generated by generating descriptors of feature points included in the feature point map. Mapping information containing matching relationships between feature points included in different input images of the plurality of input images is generated based on a plurality of descriptor maps respectively corresponding to the plurality of input images.

According to example embodiments, a method of matching images includes dividing each input image of a plurality of input images into a plurality of image tiles, generating a feature point map including a plurality of feature point tiles respectively corresponding to the plurality of image tiles by extracting feature points included in each image tile of the plurality of image tiles, generating a descriptor map including a plurality of descriptor tiles respectively corresponding to the plurality of feature point tiles by generating descriptors of feature points included in the feature point map, storing a plurality of descriptor maps respectively corresponding to the plurality of input images in a memory device, reading out descriptors for determining similarities from the memory device based on addresses of descriptor tiles included in descriptor maps corresponding to different input images of the plurality of input images, determine similarities between the descriptors that are read out and generating mapping information containing matching relationships between feature points included in the different input images based on the similarities.

According to example embodiments, a data processing device includes a feature point map generator, a descriptor map generator and an image matcher. The feature point map generator divides each input image of a plurality of input images into a plurality of image tiles and generates a feature point map including a plurality of feature point tiles respectively corresponding to a plurality of image tiles by extracting feature points included in each image tile of a plurality of image tiles. The descriptor map generator generates a descriptor map including a plurality of descriptor tiles respectively corresponding to the plurality of feature point tiles by generating descriptors of feature points included in the feature point map. The image matcher generates mapping information containing matching relationships between feature points included in different input images of the plurality of input images based on a plurality of descriptor maps respectively corresponding to the plurality of input images.

The method of matching images and the data processing device performing the method according to example embodiments may enhance image merging performance by dividing the input image into the plurality of image tiles to increase distribution uniformity of the feature points.

In addition, the method of matching images and the data processing device according to example embodiments may further increase the image merging performance by reducing processing amount and processing time for image matching using the feature point map and the descriptor map corresponding to the plurality of image tiles.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein:

FIG. 11 is a diagram illustrating an example of mapping information by a method of matching images according to example embodiments.

FIG. 24 is a diagram for describing a homography matrix used by a method of merging images according to example embodiments.

DETAILED DESCRIPTION OF THE EMBODIMENTS

Figure 1:
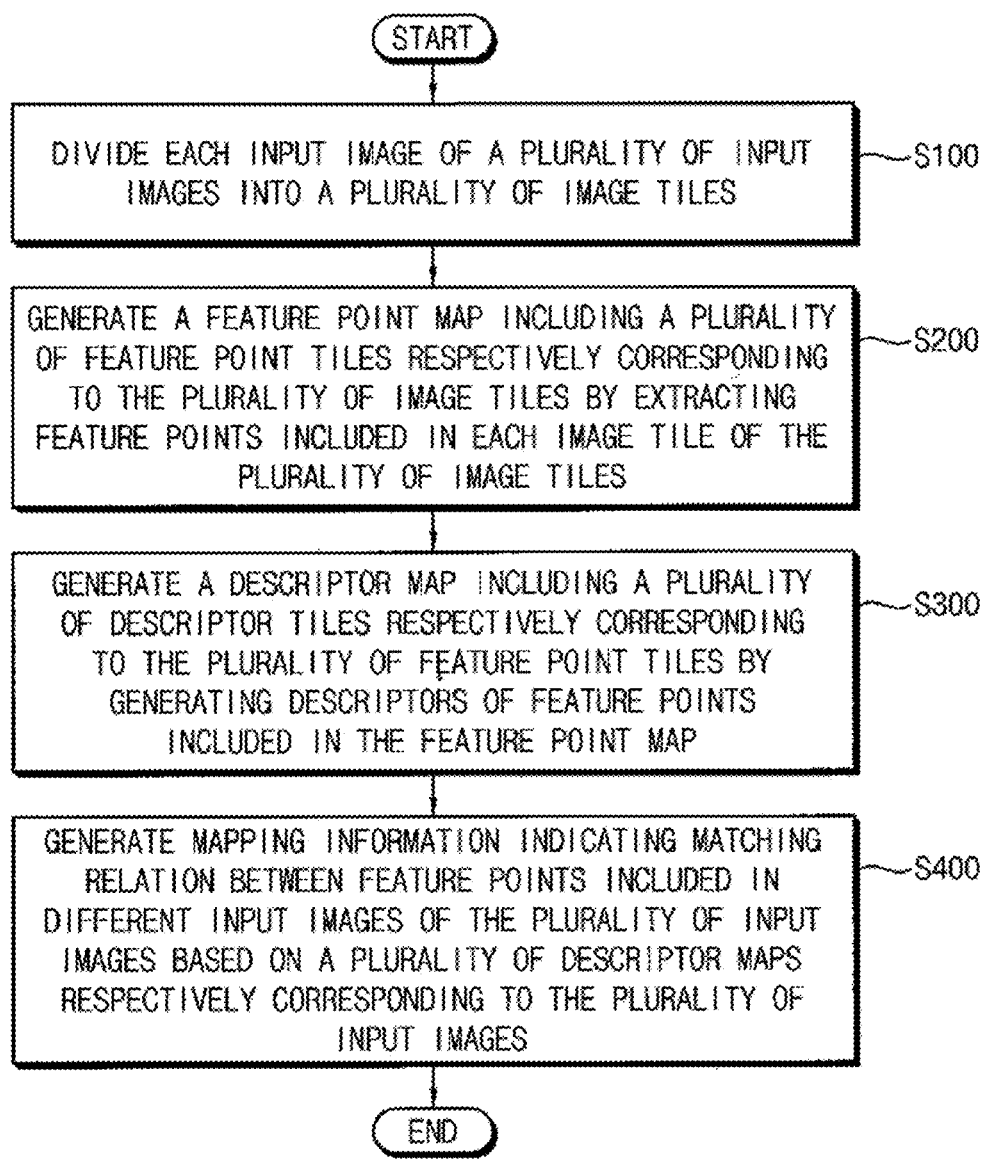
FIG. 1 is a flow chart illustrating a method of matching images according to example embodiments.

Various example embodiments will be described more fully hereinafter with reference to the accompanying drawings, in which some example embodiments are shown. In the drawings, like numerals refer to like elements throughout. The repeated descriptions may be omitted.

FIG. 1 is a flow chart illustrating a method of matching images according to example embodiments.

Referring to FIG. 1, each input image of a plurality of input images is divided into a plurality of image tiles (S100). Each input image may be divided uniformly such that the plurality of image tiles may have the same pixel width and height dimensions. The division of the input image and the image tiles will be described below with reference to FIG. 6.

A feature point map including a plurality of feature point tiles respectively corresponding to the plurality of image tiles is generated by extracting feature points included in each image tile of the plurality of image tiles (S200). In addition, a descriptor map including a plurality of descriptor tiles respectively corresponding to the plurality of feature point tiles is generated by generating descriptors of feature points included in the feature point map (S300).

In some example embodiments, the number of feature points included in each image tile may be limited to a maximum tile feature point number. For example, a maximum image feature point number indicating a maximum number of feature points to be extracted from each input image may be determined. The maximum tile feature point number may be determined by dividing the maximum image feature point number by a number of the plurality of image tiles. The number of feature points included in each image tile may be limited to the maximum tile feature point number. The feature point map and the descriptor map will be described below with reference to FIGS. 7 and 8.

Mapping information containing matching relationships between feature points included in different input images of the plurality of input images is generated based on a plurality of descriptor maps respectively corresponding to the plurality of input images (S400). The plurality of input images may be synchronized using the mapping information and a merged image from the plurality of input images may be generated based on the synchronized images.

The plurality of input images may be a set of correlated images to be merged. The plurality of input images may include at least a portion of the same scene.

In some example embodiments, as will be described below with reference to FIG. 4A, the plurality of input images may be images captured by a plurality of cameras. In some example embodiments, as will be described below with reference to FIG. 4B, the plurality of input images may be images sequentially captured by a single camera.

As such, the method of matching images according to example embodiments may enhance image merging performance by dividing the input image into the plurality of image tiles to increase distribution uniformity of the feature points. Additionally or alternatively, the method of matching images according to example embodiments may further increase the image merging performance by reducing processing amount and processing time for image matching using the feature point map and the descriptor map corresponding to the plurality of image tiles.

Figure 2:
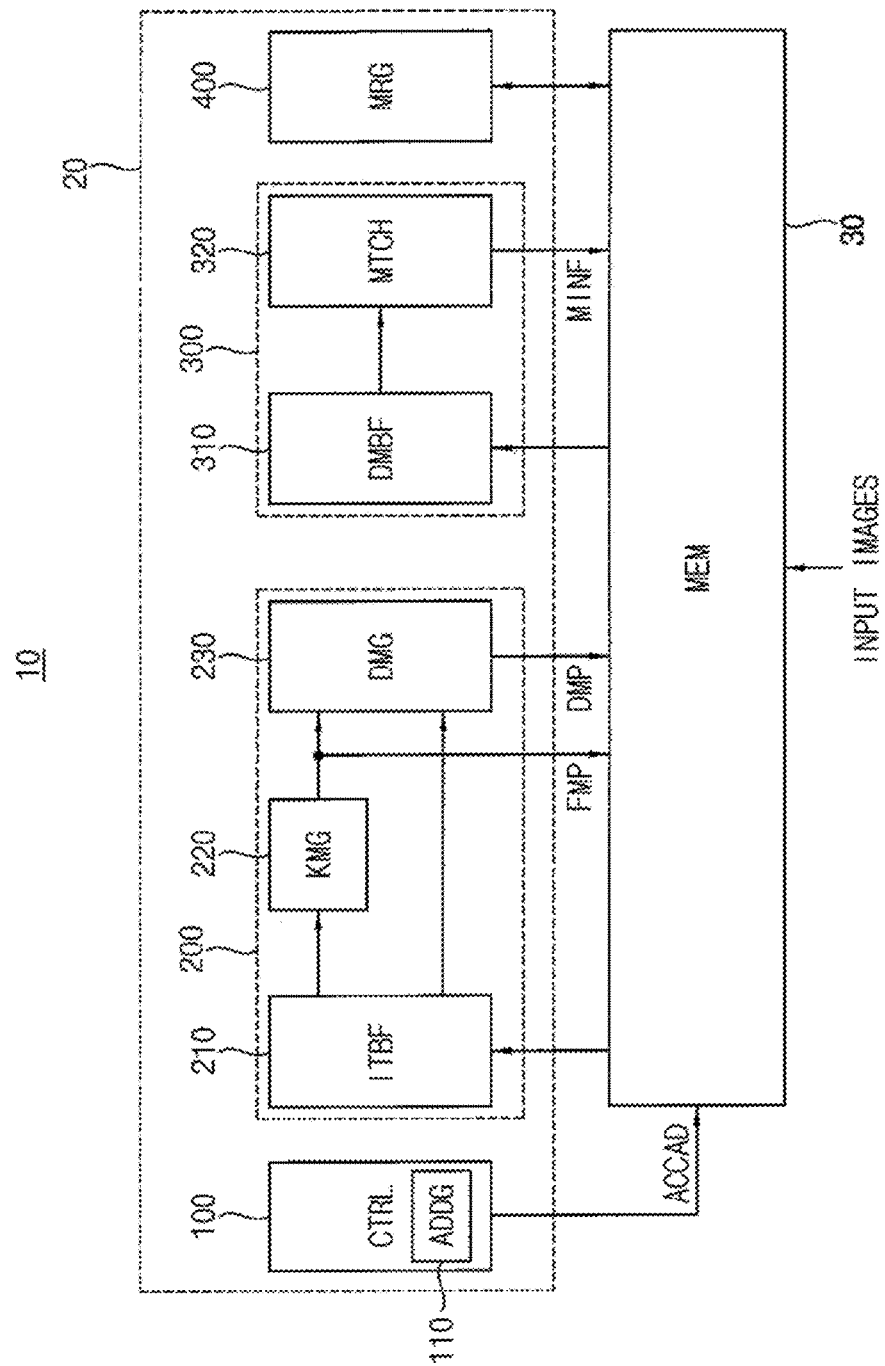
FIG. 2 is a block diagram illustrating a system including an image processing device according to example embodiments.

FIG. 2 is a block diagram illustrating a system including an image processing device according to example embodiments.

Referring to FIG. 2, a system 10 may include a data processing device 20 and a memory device 30.

The data processing device 20 may include a controller CTRL100, a feature extractor 200, an image matcher 300 and an image merger MRG 400.

The controller 100 may control overall operations of the feature extractor 200, the image matcher 300 and the image merger 400. The controller 100 may generate control signals to control the feature extractor 200, the image matcher 300 and the image merger 400.

The feature extractor 200 may include an image tile buffer ITBF 210, a feature point map generator KMG 220 and a descriptor map generator DMG 230. The image tile buffer 210 may store a plurality of input images into image tile units by dividing each input image of the plurality of input images into a plurality of image tiles. The feature point map generator 220 may generate a feature point map FMP including a plurality of feature point tiles respectively corresponding to the plurality of image tiles by extracting feature points included in each image tile of the plurality of image tiles. The descriptor map generator 230 may generate a descriptor map DMP including a plurality of descriptor tiles respectively corresponding to the plurality of feature point tiles by generating descriptors of feature points included in the feature point map FMP.

The image matcher 300 may generate mapping information MINF between feature points of input images based on a plurality of descriptor maps respectively corresponding to the plurality of input images. The image matcher 300 may include a descriptor map buffer DMBF 310 and a matcher MTCH 320. The descriptor tiles for similarity determination may be loaded to the descriptor map buffer 310 and the matcher 320 may generate the mapping information MINF based on the similarities between the descriptors of the descriptor tiles that loaded to the descriptor map buffer 310.

The image merger 400 may merge the plurality of input images based on the mapping information MINI' to generate a merged image. As will be described below with reference to FIGS. 22 through 26, the image merger 400 may generate homography matrices for conversion between the different input images based on the mapping information MINF. The image merger 400 may generate synchronized images by synchronizing the plurality of input images based on the homography matrices. The image merger 400 may perform various image processing such as image stitching, noise reduction, dynamic range conversion, etc., using the synchronized images.

The memory device 30 may receive and store images provided from an external device such as a camera. The memory device 30 may provide an image set of input images to be merged to the feature extractor 200 and the image merger 400. In addition, the memory device 30 may store the merged image generated by the image merger 400.

In some example embodiments, the memory device 30 may store the feature point maps FMP and the descriptor maps DMP respectively corresponding to the plurality of input images. The memory device 30 may provide the stored descriptor maps DMP to the image matcher 300. The image matcher 300 may determine similarities between the descriptors based on the descriptor maps DMP and generate the mapping information MINF based on the similarities.

In some example embodiments, the image tile buffer 210 and the descriptor map buffer 310 may be implemented as a single buffer. The memory device 30 may be a memory device dedicated to the data processing device 20 or a common memory device of the system 10 including the data processing device 20.

In some example embodiments, the image tile buffer 210 and the descriptor map buffer may be implemented with static random access memory (SRAM), the memory device 30 may be implemented with dynamic random access memory (DRAM), but example embodiments are not necessarily limited thereto.

In some example embodiments, the controller 100 may sequentially store the feature point tiles of the feature point maps FMP and the descriptor tiles of the descriptor maps DMP in the memory device 30 according to a predetermined storing order. In some examples, the controller may include an address generator ADDG 110. The address generator 110 may generate and provide access addresses ACCAD corresponding to the storing order to the memory device 30. The generation of the access addresses ACCAD corresponding to the storing order will be further described below with reference to FIGS. 12 through 20.

The data processing device 20 performing the method of matching images according to example embodiments may enhance image merging performance by dividing the input image into the plurality of image tiles to increase distribution uniformity of the feature points. In addition, the data processing device 20 performing the method of matching images according to example embodiments may further increase the image merging performance by reducing processing amount and processing time for image matching using the feature point map and the descriptor map corresponding to the plurality of image tiles.

Figure 3:
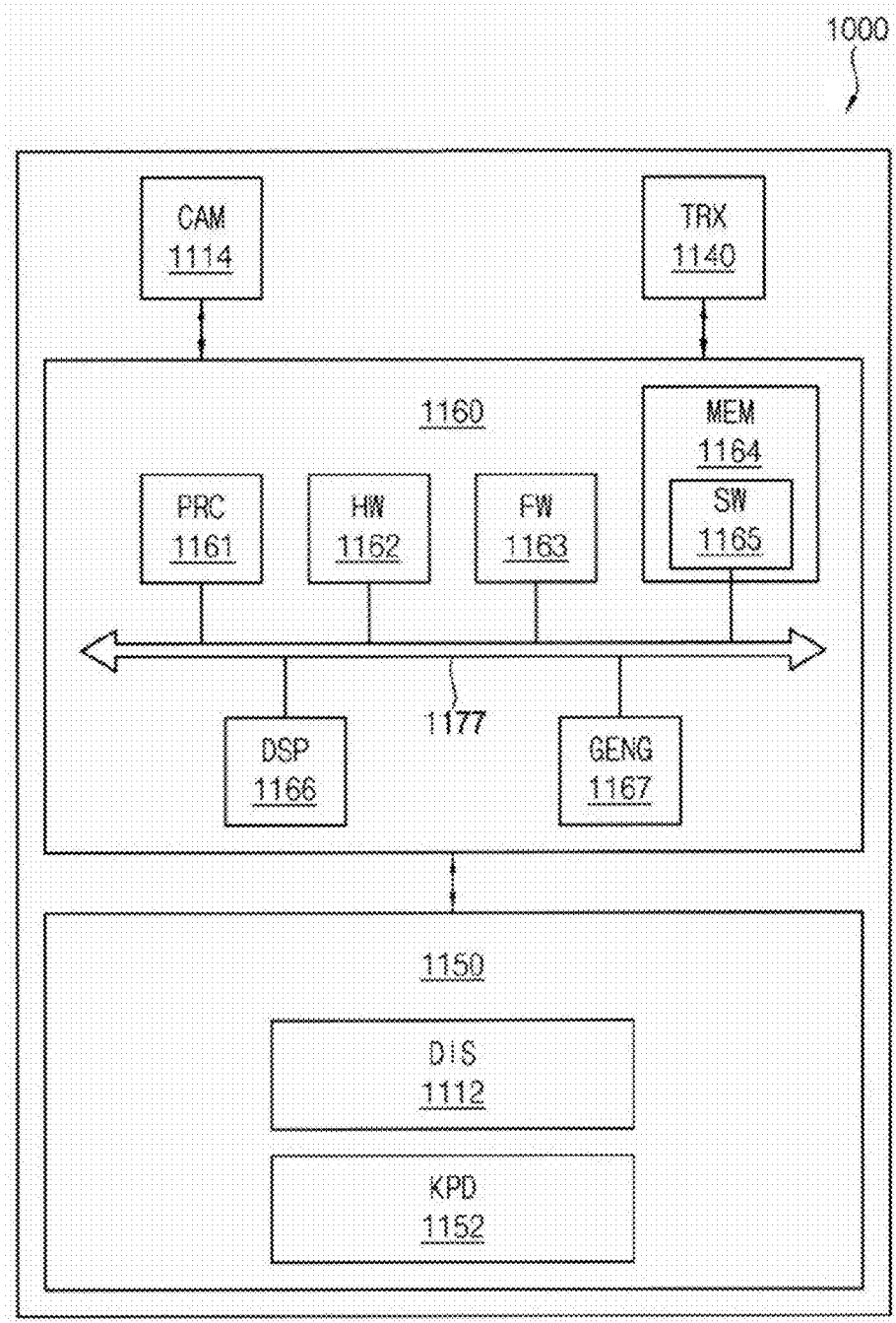
FIG. 3 is a block diagram illustrating a system according to example embodiments.

FIG. 3 is a bloc diagram illustrating a system according to example embodiments.

Referring to FIG. 3, a system 1000 may include camera module CAM 1114, a transceiver TRX 1140, a control unit 1160 and a user interface 1150.

The camera module 1114 may include a camera and/or an image sensor to capture and provide images. In some example embodiments, the camera module 1114 may include a plurality of cameras to capture a plurality of input images to be merged. In some example embodiments, the camera module 1114 may provide a plurality of input images to be merged where the plurality of input images are captured by a single camera.

The transceiver 1140 may provide connectivity through wired or wireless links to other networks such as an internet, a cellular network, etc.

The user interface 1150 may include input devices KPD 1152 such as a keyboard, a keypad, etc. and a display device DSP 1112 to display images. In some examples, a virtual keypad or keyboard may be integrated into the display device 1112 with a touch screen/sensor or the like.

The control unit 1116 may include a general purpose processor PRC 1161, a hardware device HW 1162, a firmware device FW 1163, a memory MEM 1164, a digital signal processor DSP 1166, a graphics engine GENG 1167, and a bus 1177. The control unit 1160 may perform the method of matching and merging images as described above. In other words, the control unit 1160 may be configured to perform functions of the data processing device 10 of FIG. 2.

Example embodiments may be implemented as hardware, software, a firmware or a combination thereof.

In some example embodiments, the image matching method according to example embodiments may be performed by the digital signal processor 1166. For example, the data processing device 10 as described with reference to FIG. 2 may be included in the digital signal processor 1166.

In some example embodiments, at least a portion of the image matching method according to example embodiments may be performed by program instructions that are executed by a processing device. The program instructions may be stored in the memory 1164 as software SW 1165, and the program instructions may be performed by the general purpose processor 1161 and/or the digital signal processor 1166.

In some example embodiments, to execute the program instructions, the general purpose processor 1161 may retrieve or fetch the program instructions from an internal register, an internal cache or the memory 1164 and decode and execute the instructions. During or after execution of the program instructions, the general purpose processor 1161 may write one or more results (which may be intermediate or final results) of the program instructions to the internal register, internal cache or the memory 1164.

The system 1000 may be a computer system taking any suitable physical form. For example, the system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these.

The program instruction for implementing a method of merging images may be stored in a computer-readable non-transitory storage medium or media. The computer-readable non-transitory storage medium may include one or more semiconductor-based or other integrated circuits (ICs) (for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Figure 4A:
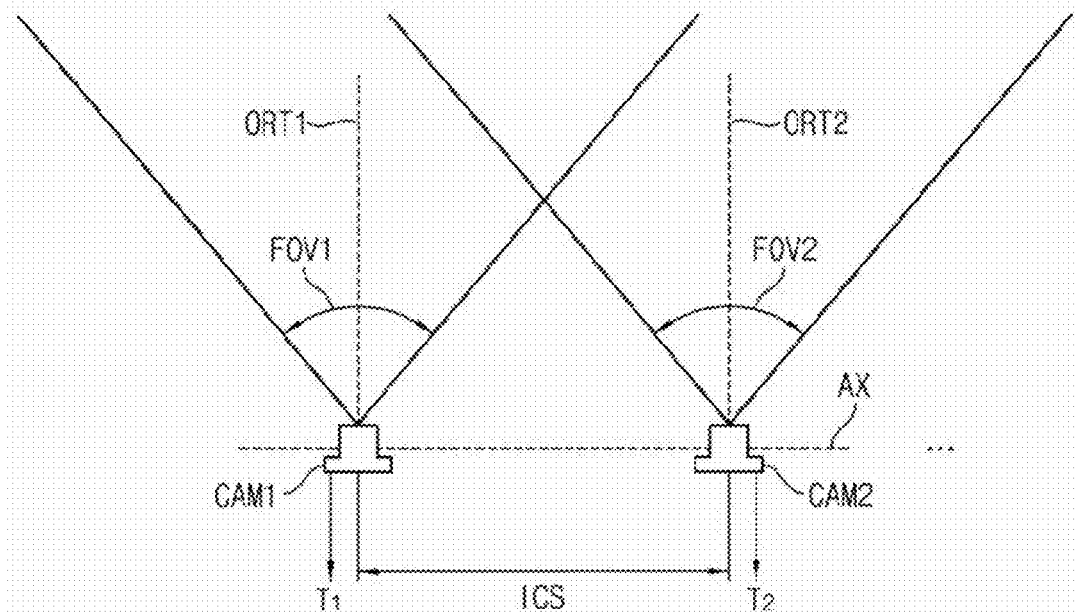
FIGS. 4A and 4B are diagrams illustrating example embodiments of providing input images to be matched and merged.
Figure 4B:
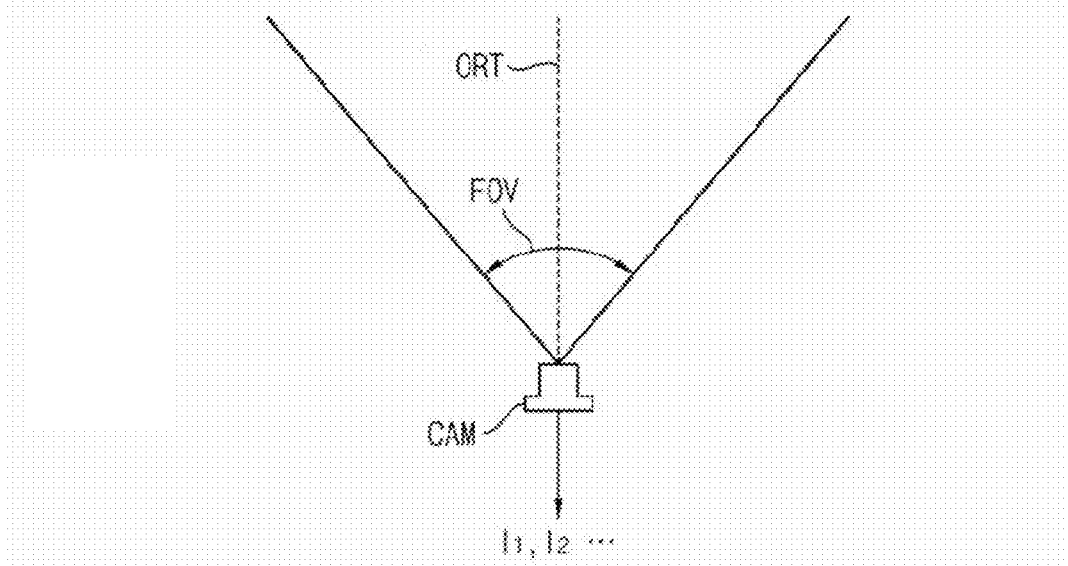

FIGS. 4A and 4B are diagrams illustrating example embodiments of providing input images to be matched and merged.

FIG. 4A illustrates an example array of cameras CAM1 and CAM2 that are disposed on an axis AX. In an example, the plurality of input images to be merged as described above may be images I1 and I2 respectively captured by the cameras CAM1 and CAM2. Two cameras CAM1 and CAM2 are illustrated in FIG. 4A, but example embodiments are not necessarily limited thereto. The plurality of input images to be merged may be provided by three or more cameras.

According to example embodiments, the cameras CAM1 and CAM2 may include one or more image sensors that are configured to capture individual photo images or a series of images as a video. For example, the cameras CAM1 and CAM2 may include a charge-coupled device (CCD) image sensor or a complementary metal-oxide-semiconductor (CMOS) active-pixel image sensor.

A camera may have a field of view (FOV) that depends at least in part on a position, focal length, or magnification of the camera and a position or size of an image sensor of the camera. As illustrated in FIG. 4A, the camera CAM1 may have a first field of view FOV1 and the camera CAM2 may have a second field of view FOV2 different from the first field of view FOV1.

The field of view of a camera may refer to a horizontal, vertical, or diagonal extent of a particular scene that is visible through the camera. Objects within the field of view of the camera may be captured by an image sensor of the camera, and objects outside the field of view may not appear on the image sensor.

A camera may have an orientation that represents an angle or a direction in which the camera is pointing. As illustrated in FIG. 4A, the camera CAM1 may have a first orientation ORT1 and the camera CAM2 may have a second orientation ORT2 different from the first orientation ORT1.

An overlapping portion of the images I1 and I2 captured by the cameras CAM1 and CAM2 may be varied by changing an inter camera spacing ICS, the field of views FOV1 and FOV2, and the orientations ORT1 and ORT2. Accordingly, synchronization or coordinate-synchronization may be required by aligning the images I1 and I2 to a same two-dimensional plane in advance to merge the images I1 and I2 efficiently.

As illustrated in FIG. 4B, the plurality of input images to be merged as described above may be images I1 and I2 that are sequentially captured by a single camera CAM. For example, the images I1 and I2 may be images captured in a serial capturing mode or images that are oversampled to enhance image quality. In these cases, the time interval may occur between the images I1 and I2, and the overlapping portion of the images I1 and I2 captured by the cameras CAM1 and CAM2 may be varied by a hand movement of a user, etc. As the case of FIG. 4A, the synchronization or the coordinate-synchronization may be required by aligning the images I1 and I2 to the same two-dimensional plane in advance to merge the images I1 and I2 efficiently.

Figure 5:
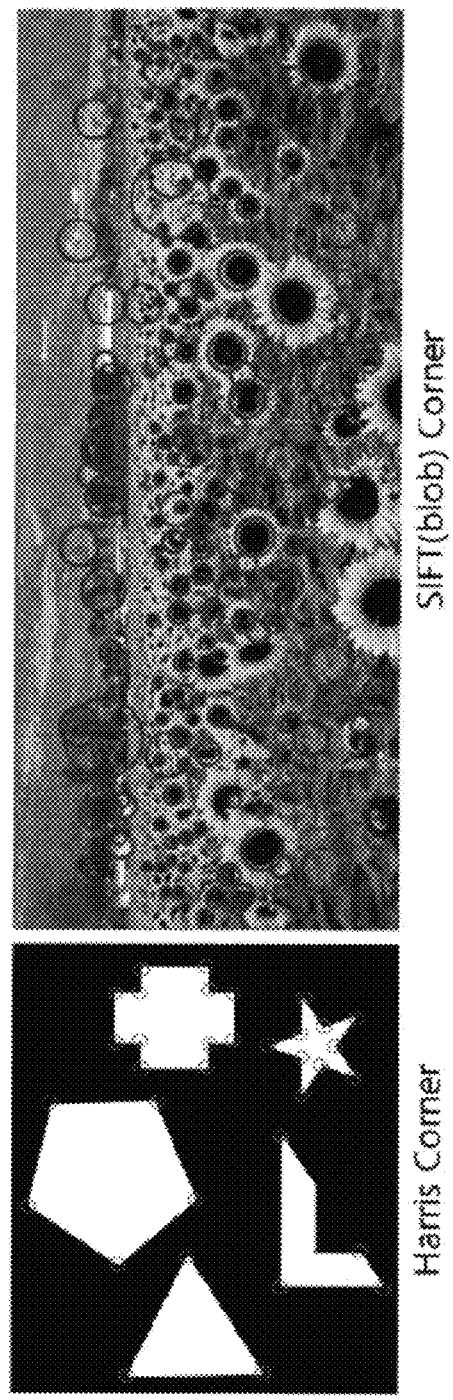
FIG. 5 is a diagram illustrating schemes of extracting feature points used by a method of matching images according to example embodiments.

FIG. 5 is a diagram illustrating schemes of extracting feature points used by a method of matching images according to example embodiments.

Image matching may be implemented by extracting feature points in images to be merged. The feature points may be referred to as key points or interesting points.

In matching corresponding portions of images, it may be necessary to extract discernable feature points that may be recognized and differentiated from a background. For example, the conditions of the discernable feature points may include high degree of discernment from the background even though shape and location of an object, camera parameters, illumination, etc. are changed. Example discernable feature points are corner points, and many feature point extracting algorithms are based on the corner point extraction such as Harris corner and scale-invariant feature points (SIFT) corner as illustrated in FIG. 5.

In some example embodiments, the feature point detection and point matching may be performed on grayscale versions of images and a contrast may be applied to the images in a separate operation or through a look-up table. In some example embodiments, feature point detection may be performed globally on the images using local contrast enhancement. The local contrast enhancement increases "local" contrast, while at the same time preventing an increase in "global" contrast, thereby protecting large-scale shadow/highlight detail. For example, local contrast gradients may be indicative of an edge, corner, or "blob" that corresponds to a feature. Features of the images may be detected using a feature detection algorithm such as scale-invariant feature transform (SIFT), speeded up robust features (SURF), or oriented FAST and Rotated BRIEF (ORB), where FAST stands for "features from accelerated segment test" and BRIEF stands for "binary robust independent elementary features." In some example embodiments, a feature point detection process may detect one or more feature points. For example, feature points may be detected by taking a difference of multiple Gaussian smoothing operations. Additionally or alternatively, the position of the feature points and the contrast values of each feature point for each search region may be stored.

In some example embodiments, a size of an area used to match feature points in different images may be set according to a size of images. In some example embodiments, a geometry of camera system may be known, and based on the known camera-system geometry, an approximate number of pixels of the search regions and overlap areas of the images may be known a priori. For example, the location and orientation of cameras of the camera system may be fixed relative to one another, and the overlap between the cameras may be known.

In some example embodiments, determining corresponding pairs of the feature points respectively included in the different images may be performed using a nearest-neighbor search algorithm. For example, a nearest-neighbor search algorithm may identify patterns of feature points within each search region of overlap area of one image that match corresponding patterns of feature points within each search region of the overlap area of another image. In some example embodiments, a nearest-neighbor algorithm may use a search radius around each feature point to determine the pairs of corresponding feature points. For example, a search area may have a radius of 32 pixels, 64 pixels, or any suitable radius, or a search area may have a size of 32 pixels×32 pixels, 64 pixels×64 pixels, or any suitable size. In some example embodiments, a secondary refinement may be used to realign the pairs of corresponding feature points before a final homography calculation.

Figure 6:
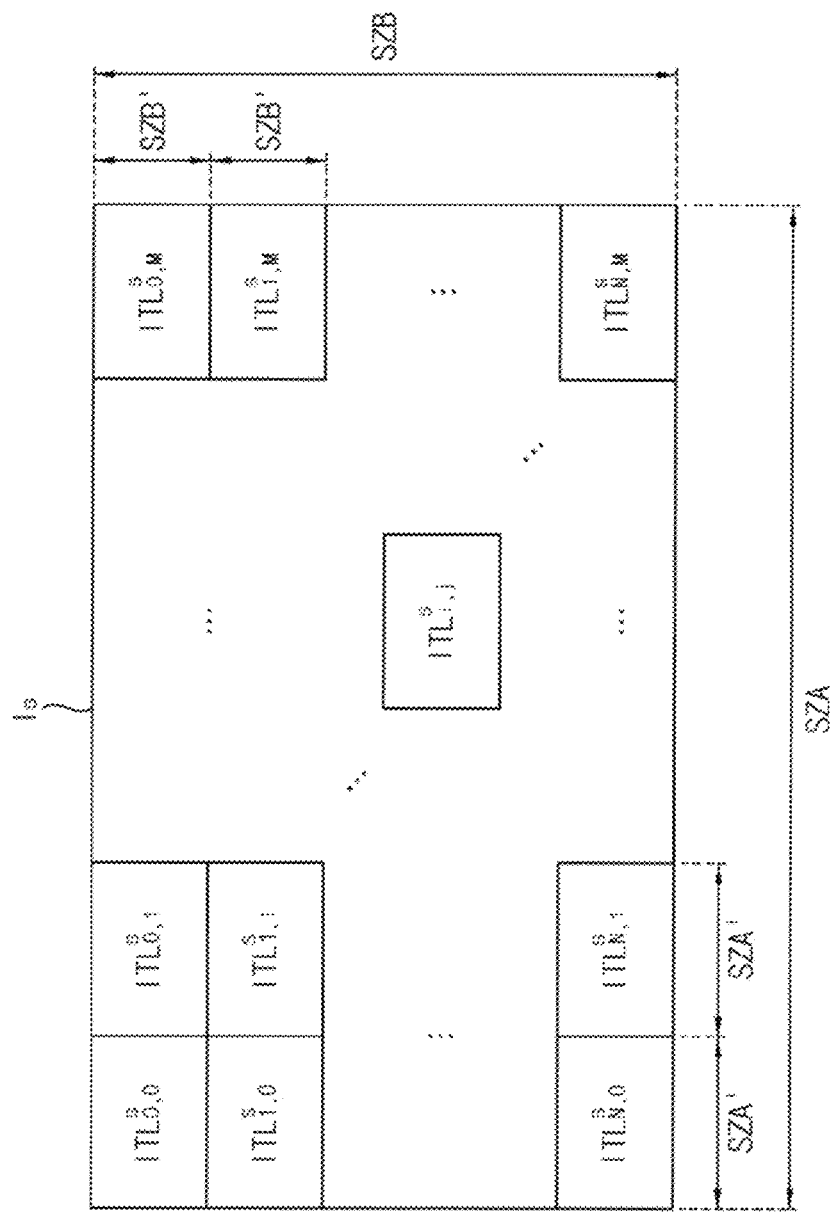
FIG. 6 is a diagram illustrating an example embodiment of dividing an image by a method of matching images according to example embodiments.

FIG. 6 is a diagram illustrating an example embodiment of dividing an image by a method of matching images according to example embodiments.

Referring to FIG. 6, each input image Is may be divided into a plurality of image tiles $ITL_{0,0}^s \sim ITL_{N,M}^s$. In $ITL_{i,j}^s$, s indicates an index of an input image, i indicates a tile row index, and j indicates a tile column index.

Each input image Is may be divided uniformly such that the plurality of image tiles $ITL_{0,0}^s \sim ITL_{N,M}^s$ respectively include pixels of same numbers of rows and columns. In other words, the plurality of image tiles $ITL_{0,0}^s \sim ITL_{N,M}^s$ may have the same row size SZA' and the same column size SZB'.

When the row size SZA' and the column size SZB' of the image tile are determined, the row number N and the column number M of the divided image tiles may be determined by Expression 1, and each input image Is may include N*M image tiles $ITL_{0,0}^s \sim ITL_{N,M}^s$.

$$N=SZA/SZA'$$

$$M=SZB/SZB' \quad \text{Expression 1}$$

In Expression 1, N indicates the row number of the image tiles, M indicates the column number of the image tiles, SZA indicates the row size of each input image, SZB indicates the column size of each input image, SZA' indicates the row size of each image tile and SZB' indicates the column size of each image tile.

As will be described below, the distribution uniformity of the feature points may be enhanced by uniformly dividing the input image and the processing amount and the processing time to merge images may be reduced.

Figure 7:
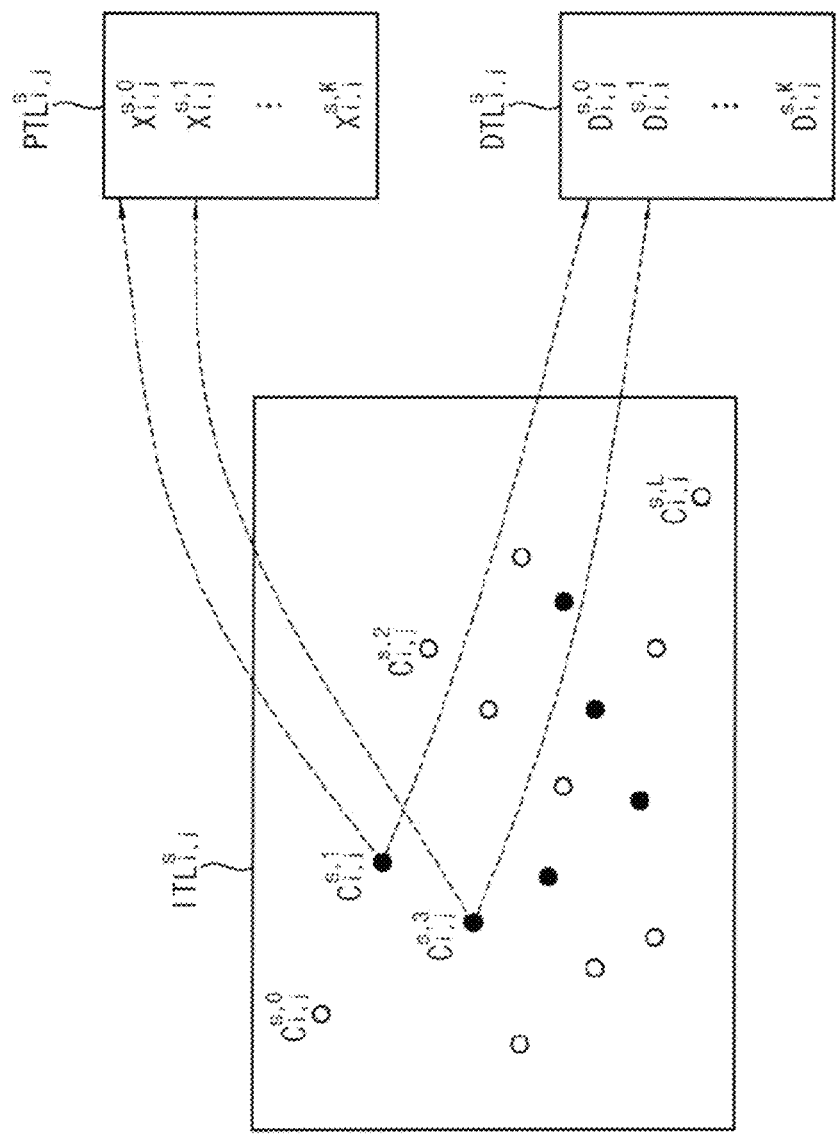
FIG. 7 is a diagram illustrating an example embodiment of generating a feature point map and a descriptor map by a method of matching images according to example embodiments.
Figure 8:
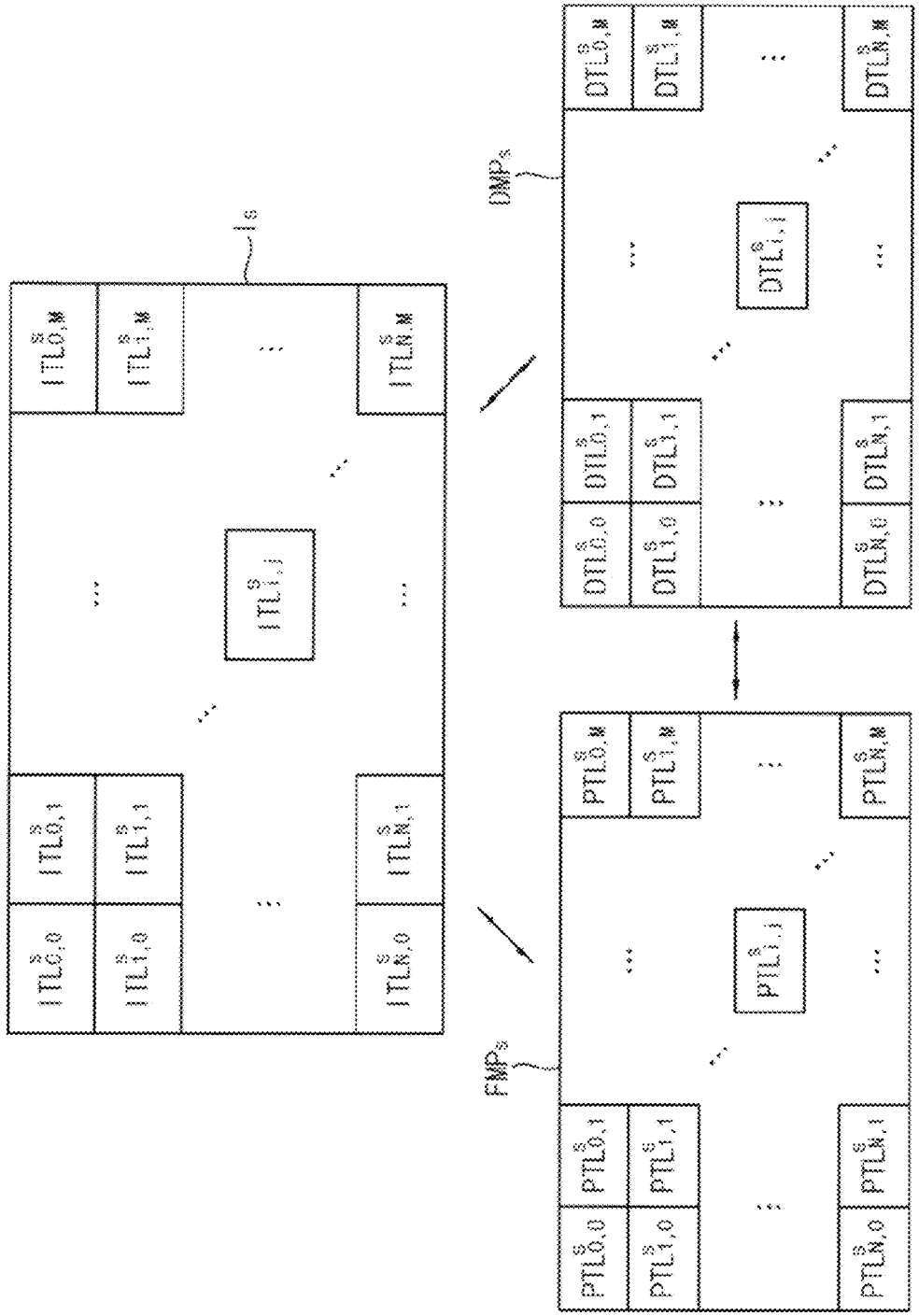
FIG. 8 is a diagram illustrating mapping relations between an input image, a feature point map and a descriptor map by a method of matching images according to example embodiments.

FIG. 7 is a diagram illustrating an example embodiment of generating a feature point map and a descriptor map by a method of matching images according to example embodiments. FIG. 8 is a diagram illustrating mapping relations between an input image, a feature point map and a descriptor map by a method of matching images according to example embodiments.

The procedure of merging a plurality of input images may be divided into four steps. In one step, a plurality of feature points or key points such as corner points may be extracted from each input image. In another step, descriptors may be generated for each of the extracted feature points. In another step, mapping information containing matching relationships between the feature points of the different input images may be generated using the descriptors of the feature points. In another step, homography between the input images may be estimated using the mapping information to generate a merged image.

Three factors in extracting the feature points may affect the performance of the estimated homography.

The first factor is to extract feature points that are likely to correspond to feature points of the next image or image tile. If the feature points extracted from the different input images are different, the pairs of the corresponding feature points may be insufficient and the performance of the estimated homography may be decreased. Accordingly, in some examples, feature points that are likely to correspond to feature points in the next image or image tile may be described as having a "good" or a "high" response. To increase the number of pairs of corresponding feature points, it may be necessary to extract feature points of good response. In other words, feature repeatability may be necessary in extracting the feature points.

The second factor is distribution of the extracted feature points. If only the response of the feature point is considered, the extracted feature points may be concentrated in the particular portion of an image. In this case, the estimated homography may be biased towards the particular region of the image.

The third factor is to limit the number of the extracted feature points considering restrictions of processing environments such as the image size, the processing speed, etc. The extracted feature points of the limited number may have to be distributed uniformly in the entire image portions in addition to having the good response.

Conventionally the feature points are extracted sufficiently and the feature points of the limited number are selected among the over extracted feature points using a sorting algorithm. In this case, the feature points of high response may be extracted but the processing amount is increased and the distribution of the feature points cannot be considered. A spatial data structure scheme such as QuadTree may be used to enhance the distribution uniformity. However, the image is divided into four regions repeatedly by QuadTree and thus the processing complexity is severely increased.

According to example embodiments, the predetermined number of feature points may be extracted rapidly using parallel processing by a digital signal processor (DSP) and the extracted feature points may have the high distribution uniformity and the high response.

FIG. 7 illustrates one image tile $ITL_{i,j}^s$ in the input image Is as described with reference to FIG. 6. As described above, a maximum image feature point number Kmax indicating a maximum number of feature points included in each input image Is may be determined by the image size, the processing speed, etc. As shown in Expression 2, determining a maximum tile feature point number K by dividing the maximum image feature point number Kmax by a number N*M of the plurality of image tiles $ITL_{0,0}^s \sim ITL_{N,M}^s$ and the number of feature points included in each image tile may be limited to the maximum tile feature point number K.

$$K=K\max/(N*M) \quad \text{Expression 2}$$

Referring to FIG. 7, L candidate feature points $C_{i,j}^{s,0} \sim C_{i,j}^{s,L}$ may be determined with respect to each image tile $ITL_{i,j}^s$ by performing the feature point extraction. In $C_{i,j}^{s,p}$, s indicates an input image index, i indicates the tile row index, j indicates the tile column index and p indicates the point index in each image tile $ITL_{i,j}^s$.

The feature point tile $PTL_{i,j}^s$ may be generated by extracting the K feature points $X_{i,j}^{s,0} \sim X_{i,j}^{s,K}$ of higher response among the L candidate feature points $C_{i,j}^{s,0} \sim C_{i,j}^{s,L}$. Here, K is the maximum tile feature point number K as described above.

The descriptor tile $DTL_{i,j}^s$ corresponding to each image tile $ITL_{i,j}^s$ and each feature point tile $PTL_{i,j}^s$ may be generated by generating the K descriptors $D_{i,j}^{s,0} \sim D_{i,j}^{s,K}$ of the K feature points $X_{i,j}^{s,0} \sim X_{i,j}^{s,K}$ included in each feature point tile $PTL_{i,j}^{s}$ corresponding to each image tile $ITL_{i,j}^{s}$.

According to example embodiments, the descriptors may be generated based on at least one of ORB (Oriented FAST (Features from Accelerated Segment Test) and Rotated BRIEF (Binary Robust Independent Elementary Features)), SIFT (Scale-Invariant Feature Transform), SURF (Speeded Up Robust Features) and MSD (Maximal Self-Dissimilarities), though the present disclosure is not necessarily limited thereto.

FIG. 8 illustrates an input image Is divided into a plurality of image tiles $ITL_{0,0}^{s} \sim ITL_{N,M}^{s}$, a feature point map FMPs including a plurality of feature point tiles $PTL_{0,0}^{s} \sim PTL_{N,M}^{s}$ respectively corresponding to the plurality of image tiles $ITL_{0,0}^{s} \sim ITL_{N,M}^{s}$ and a descriptor map DMPs including a plurality of descriptor tiles $DTL_{0,0}^{s} \sim DTL_{N,M}^{s}$ respectively corresponding to the plurality of image tiles $ITL_{0,0}^{s} \sim ITL_{N,M}^{s}$.

The feature point map generator 220 in FIG. 2 may generate each feature point tile of the plurality of feature point tiles $PTL_{0,0}^{s} \sim PTL_{N,M}^{s}$ such that each of the plurality of feature point tiles $PTL_{0,0}^{s} \sim PTL_{N,M}^{s}$ include the same number of data bits corresponding to a feature point tile size. In addition, the descriptor map generator 230 in FIG. 2 may generate each descriptor tile of the plurality of descriptor tiles $DTL_{0,0}^{s} \sim DTL_{N,M}^{s}$ such that each of the plurality of descriptor tiles $DTL_{0,0}^{s} \sim DTL_{N,M}^{s}$ include the same number of data bits corresponding to a descriptor tile size.

The image tiles, the feature point tiles and the descriptor tiles may respectively correspond to each other by positions on a two-dimensional plane. Here, the position on the two-dimensional plane may correspond to the tile row index i and the tile column index j. As will be described below, similarity between the descriptors may be determined, regardless of a Euclidean distance between the feature points, based on the positions of the descriptor tiles on the two-dimensional plane as described by the tile row index i and the tile column index j. In some example embodiments, the similarity between the descriptors may correspond to a Hamming distance between the descriptors.

As such, according to example embodiments, the feature points and the descriptors may be generated based on the tiles of the same size, that is, the same data size. The feature points of high distribution uniformity and high response may be obtained without the repeated division of the image space by data schemes such as QuadTree, and the number of the feature points to be extracted in the entire image may be limited efficiently.

The feature point tiles and the descriptor tiles may include positional information corresponding to the same two-dimensional plane as the image tiles. In other words, the feature point tile, the descriptor tile and the image tile having the same tile row index i and the tile column index may correspond to each other.

In some example embodiments, as will be described below with reference to FIGS. 12 through 20, information on the distance between the feature points may be represented by an address of a memory device using information on the position on the two-dimensional plane, which corresponds to the tile row index i and the tile column index j. In this case, access to the data for the pixel positions of the feature points and the corresponding descriptors may be possible by parsing or processing the addresses. Further, through such address processing, efficient access to the information may be implemented in the processes of removing the pairs of the feature points of the low correspondence and the homography operations.

Figure 9:
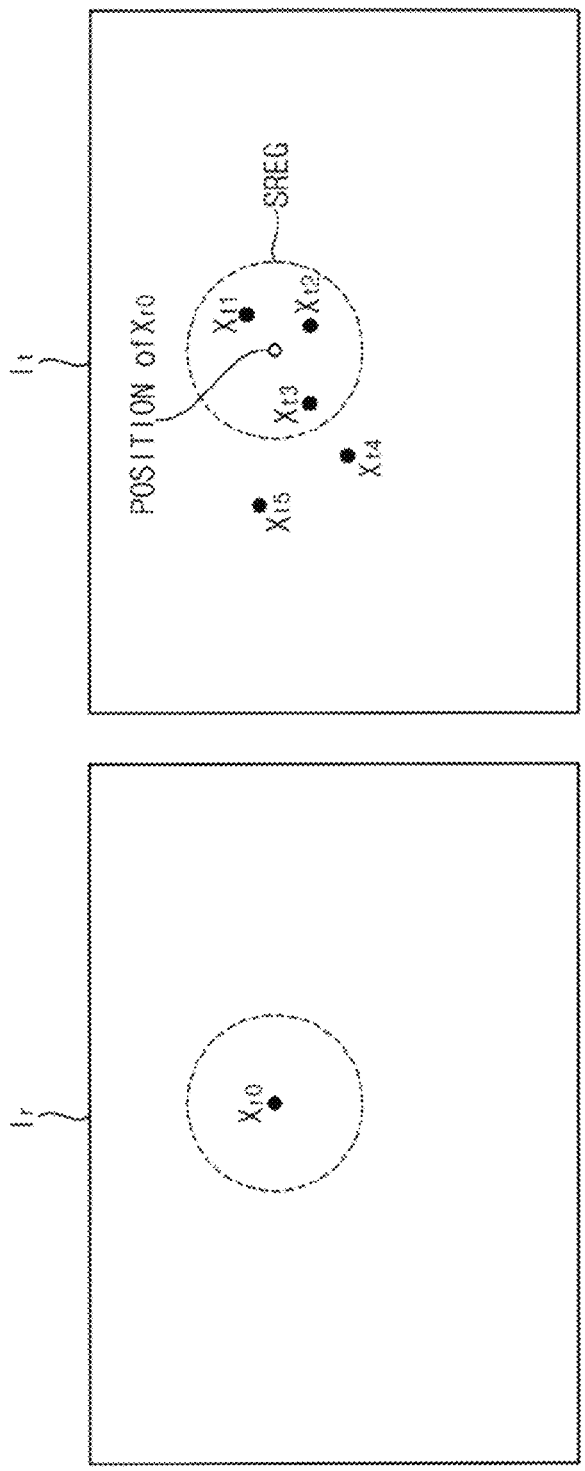
FIG. 9 is a diagram illustrating an example search region to determine correspondence of feature points.
Figure 10:
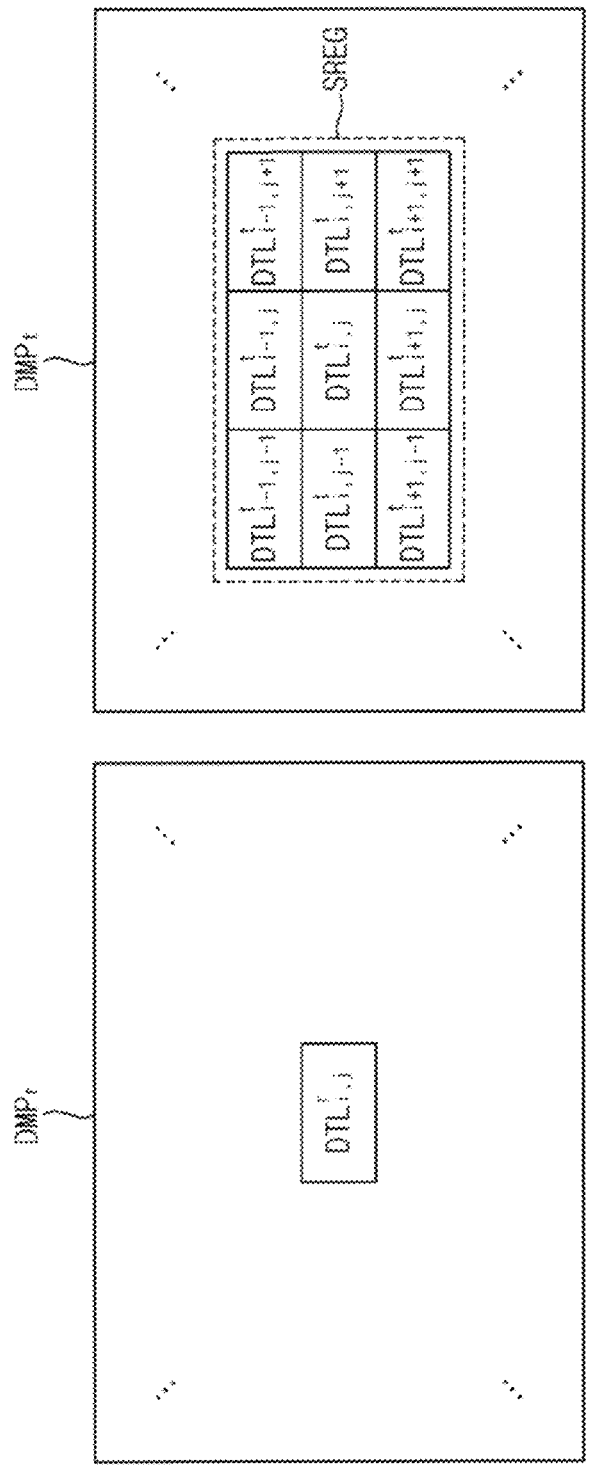
FIG. 10 is a diagram illustrating an example embodiment of setting a search region according to example embodiments.

FIG. 9 is a diagram illustrating an example search region to determine correspondence of feature points, and FIG. 10 is a diagram illustrating an example embodiment of determining a search region according to the present disclosure.

In image merging, corresponding pairs of the feature points may be searched based on a restriction to the spatial distance between the feature points and similarities between the descriptors of the feature points.

Referring to FIG. 9, similarities between a reference feature point Xr0 in a reference image Ir and feature points Xt1~Xt5 in a target image It may be estimated to determine the feature point having the highest similarity as the feature point corresponding to the reference feature point Xr0. As illustrated in FIG. 9, a search region SREG centered on the position of the reference point Xr0 on the two-dimensional plane may be determined and the feature points Xt1~Xt3 in the search region SREG may be selected for similarity calculation and the other feature points may be excluded. In some cases, the distance between the feature points may be obtained as the Euclidean distance. The processing amount may be increased severely when calculating a Euclidean distance to find the feature points included in the search region SREG.

Referring to FIG. 10, a reference descriptor tile $DTL_{i,j}^{r}$ may be determined from among a plurality of descriptor tiles included in a reference descriptor map DMPr corresponding to a reference image of the plurality of input images.

A center target descriptor tile $DTL_{i,j}^{t}$ may be determined from among a plurality of descriptor tiles included in a target descriptor map DMPt corresponding to a target image of the plurality of input images, such that the center target descriptor tile $DTL_{i,j}^{t}$ is located at the same position as the reference descriptor tile $DTL_{i,j}^{r}$ on a two-dimensional plane. The descriptor tile having the same tile row index and the same tile column index as the reference descriptor tile $DTL_{i,j}^{r}$ may be determined as the center target descriptor tile $DTL_{i,j}^{t}$.

Neighboring target descriptor tiles $DTL_{i-j-1}^{t}$, $DTL_{i-1,j}^{t}$, $DTL_{i-1,j}^{t}$, $DTL_{i,j-1}^{t}$, $DTL_{i,j+1}^{t}$, $DTL_{i+1,j-1}^{t}$, $DTL_{i+1,j}^{t}$, and $DTL_{i+1,j+1}^{t}$ may be determined from among the plurality of descriptor tiles included in the target descriptor map DMPt, such that the neighboring target descriptor tiles $DTL_{i-j-1}^{t}$, $DTL_{i-1,j}^{t}$, $DTL_{i-1,j}^{t}$, $DTL_{i,j-1}^{t}$, $DTL_{i,j+1}^{t}$, $DTL_{i+1,j-1}^{t}$, $DTL_{i+1,j}^{t}$, and $DTL_{i+1,j+1}^{t}$ are adjacent to the center target descriptor tile $DTIl_i$ on the two-dimensional plane. The descriptor tiles having tile row indices and column indices that are offset from the index of the reference descriptor tile $DTL_{i,j}^{r}$ by less than a predetermined value may be determined as the neighboring target descriptor tiles. In this example, the neighboring target descriptor tiles are $DTL_{i-j-1}^{t}$, $DTL_{i-1,j}^{t}$, $DTL_{i-1,j}^{t}$, $DTL_{i,j-1}^{t}$, $DTL_{i,j+1}^{t}$, $DTL_{i+1,j-1}^{t}$, $DTL_{i+1,j}^{t}$, and $DTL_{i+1,j+1}^{t}$.

As such, the center target descriptor tile and the neighboring target descriptor tiles, which are determined through the comparison of the tile row index and the tile column index, may be set as the search region SREG for the similarity calculation.

Similarities may be determined between a reference descriptor included in the reference descriptor tile $DTL_{i,j}^{r}$ and target descriptors included in the center target descriptor tile $DTL_{i,j}^{t}$ and the neighboring target descriptor tiles $DTL_{i-j-1}^{t}$, $DTL_{i-1,j}^{t}$, $DTL_{i-1,j}^{t}$, $DTL_{i,j-1}^{t}$, $DTL_{i,j+1}^{t}$, $DTL_{i+1,j-1}^{t}$, $DTL_{i+1,j}^{t}$, and $DTL_{i+1,j+1}^{t}$. A feature point matched to a reference feature point corresponding to the reference descriptor may be determined from among target feature points corresponding to the target descriptors based on the similarities. As described with reference to FIG. 7, the feature point and the corresponding descriptor may have the same point index p.

FIG. 10 illustrates the search region SREG including the nine descriptor tiles but the search region SREG may be set to include varying numbers of descriptor tiles depending on the input image size, the number of the image tiles included in each input image, the target processing time, etc.

As such, regardless of the Euclidean distance between the feature points, the search region SREG may be set and the similarity calculation may be performed based on the positions of the descriptor tiles on the two-dimensional plane, where the position corresponds to the tile row index and the tile column index.

FIG. 11 is a diagram illustrating an example of mapping information by a method of matching images according to example embodiments.

FIG. 11 illustrates an example of matching information MINF of feature points Xij respectively included in the first through fifth images I0~I4. In FIG. 11, the feature points in the same row may be matched to each other. For example, it will be understood form the matching information MINF that the feature point X02 of the first image I0, the feature point X11 of the second image I1, the feature point X22 of the third image I2, and the feature point X32 of the fourth image I3 correspond to one another and the fifth image I4 has no corresponding feature point. Using such mapping information MINF, image merging may be performed as be described below with reference to FIGS. 22 through 26.

Hereinafter, a method of matching images based on addresses according to example embodiments will be described with reference to FIGS. 12 through 20.

Figure 12:
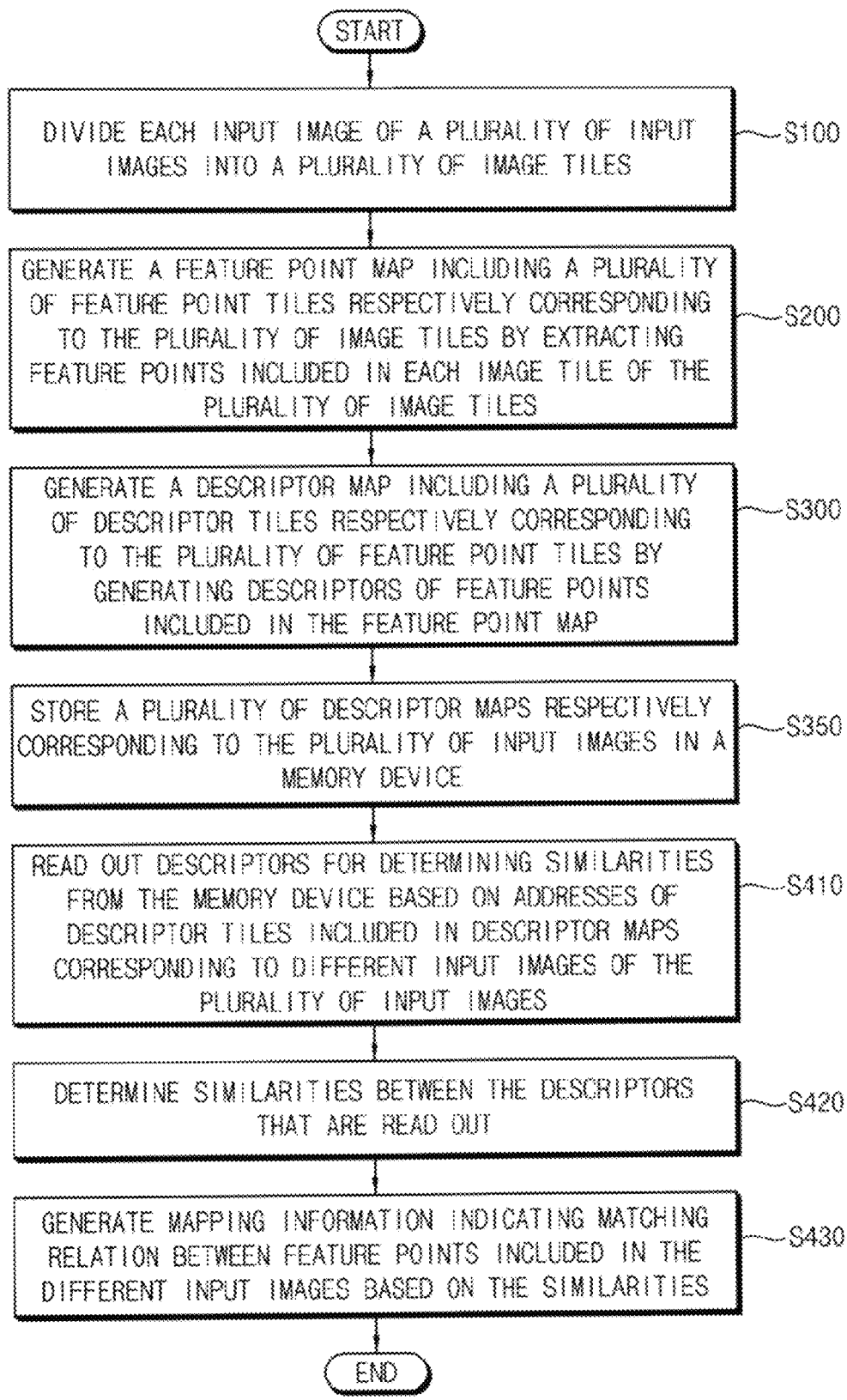
FIG. 12 is a flow chart illustrating a method of matching images according to example embodiments.

FIG. 12 is a flow chart illustrating a method of matching images according to example embodiments.

Referring to FIG. 12, each input image of a plurality of input images is divided into a plurality of image tiles (S100). As described with reference to FIG. 6, each input image may be divided uniformly such that each image tile of the plurality of image tiles may include pixels of same numbers of rows and columns.

A feature point map including a plurality of feature point tiles respectively corresponding to the plurality of image tiles is generated by extracting feature points included in each image tile of the plurality of image tiles (S200). In addition, a descriptor map including a plurality of descriptor tiles respectively corresponding to the plurality of feature point tiles is generated by generating descriptors of feature points included in the feature point map (S300).

In some example embodiments, as described with reference to FIGS. 7 and 8, the number of feature points included in each image tile may be limited to a maximum tile feature point number. For example, a maximum image feature point number indicating a maximum number of feature points included in each input image may be determined. The maximum tile feature point number may be determined by dividing the maximum image feature point number by the number of image tiles in the plurality of image tiles, and the number of feature points included in each image tile may be limited to the maximum tile feature point number.

A plurality of descriptor maps corresponding to the plurality of input images may be stored in a memory device (S350). In some example embodiments, the plurality of feature point tiles corresponding to each input image may be sequentially stored in a memory device from a feature point start address corresponding to each input image by a feature point tile address offset. In the same way, the plurality of descriptor tiles corresponding to each input image may be sequentially stored in the memory device from a descriptor start address corresponding to each input image by a descriptor tile address offset in the same or similar order to storing the plurality of feature point tiles corresponding to each input image.

Mapping information containing matching relationships between feature points included in different input images of the plurality of input images may be generated based on the descriptor maps stored in the memory device.

Descriptors for determining similarities may be read out from the memory device based on addresses of descriptor tiles included in descriptor maps corresponding to different input images of the plurality of input images (410). Here, the descriptors for determining similarities may indicate the reference descriptor tile, the center target descriptor tile and the neighboring target descriptors as described with reference to FIG. 10.

Similarities may be determined between the descriptors that are read out (S420). Mapping information containing matching relationships between feature points included in the different input images may be generated based on the similarities (S430). The plurality of input images may be synchronized using the mapping information and a merged image of the plurality of input images may be generated based on the synchronized images.

The plurality of input images may be a set of correlated images to be merged. The plurality of input images may include at least a portion of the same scene.

In some example embodiments, as described below with reference to FIG. 4A, the plurality of input images may be images respectively captured by a plurality of cameras. In some example embodiments, as described below with reference to FIG. 4B, the plurality of input images may be images sequentially captured by a single camera.

As such, the method of matching images according to example embodiments may enhance image merging performance by dividing the input image into a plurality of image tiles to increase distribution uniformity of the feature points. In addition, the method of matching images according to example embodiments may further increase the image merging performance by reducing processing amount and processing time for image matching using the feature point map and the descriptor map corresponding to the plurality of image tiles.

Figure 13:
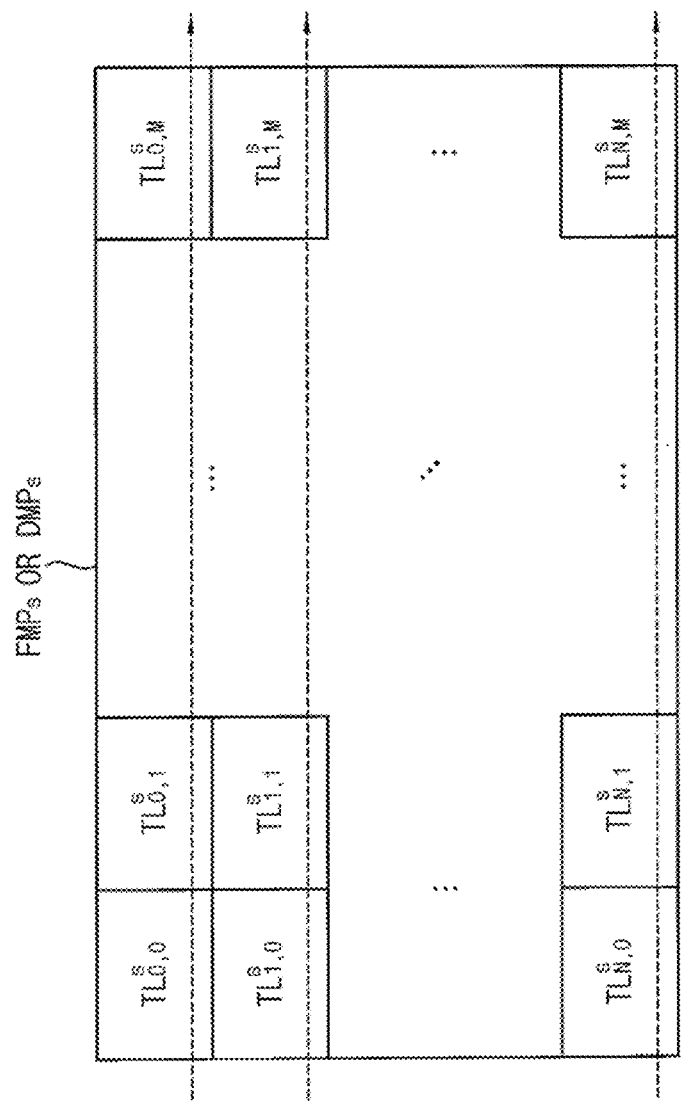
FIG. 13 is a diagram illustrating an example embodiment of storing a feature point map and a descriptor map by a method of matching images according to example embodiments.

FIG. 13 is a diagram illustrating an example embodiment of storing a feature point map and a descriptor map by a method of matching images according to example embodiments.

Referring to FIG. 13, according to a storing order of row units, a plurality of tiles $TL_{0,0}^s \sim TL_{N,M}^s$ included in a feature point map FMPs or a descriptor map DMPs may be sequentially stored in a memory device. For example, the plurality of tiles $TL_{0,0}^s \sim TL_{N,M}^s$ may be a plurality of feature point tiles included in the feature point map FMPs or a plurality of descriptor tiles included in the descriptor map DMPs.

According to a storing order of row units, the tiles $TL_{0,0}^s \sim TL_{0,M}^s$ of the first row may be stored at sequentially increasing addresses of the memory device, the tiles $TL_{1,0}^s \sim TL_{1,M}^s$ of the second row may be stored at sequentially increasing addresses of the memory device, and similarly the tiles $TL_{N,0}^s \sim TL_{N,M}^s$ of the last row may be stored at the sequentially increasing addresses of the memory device.

Figure 14:
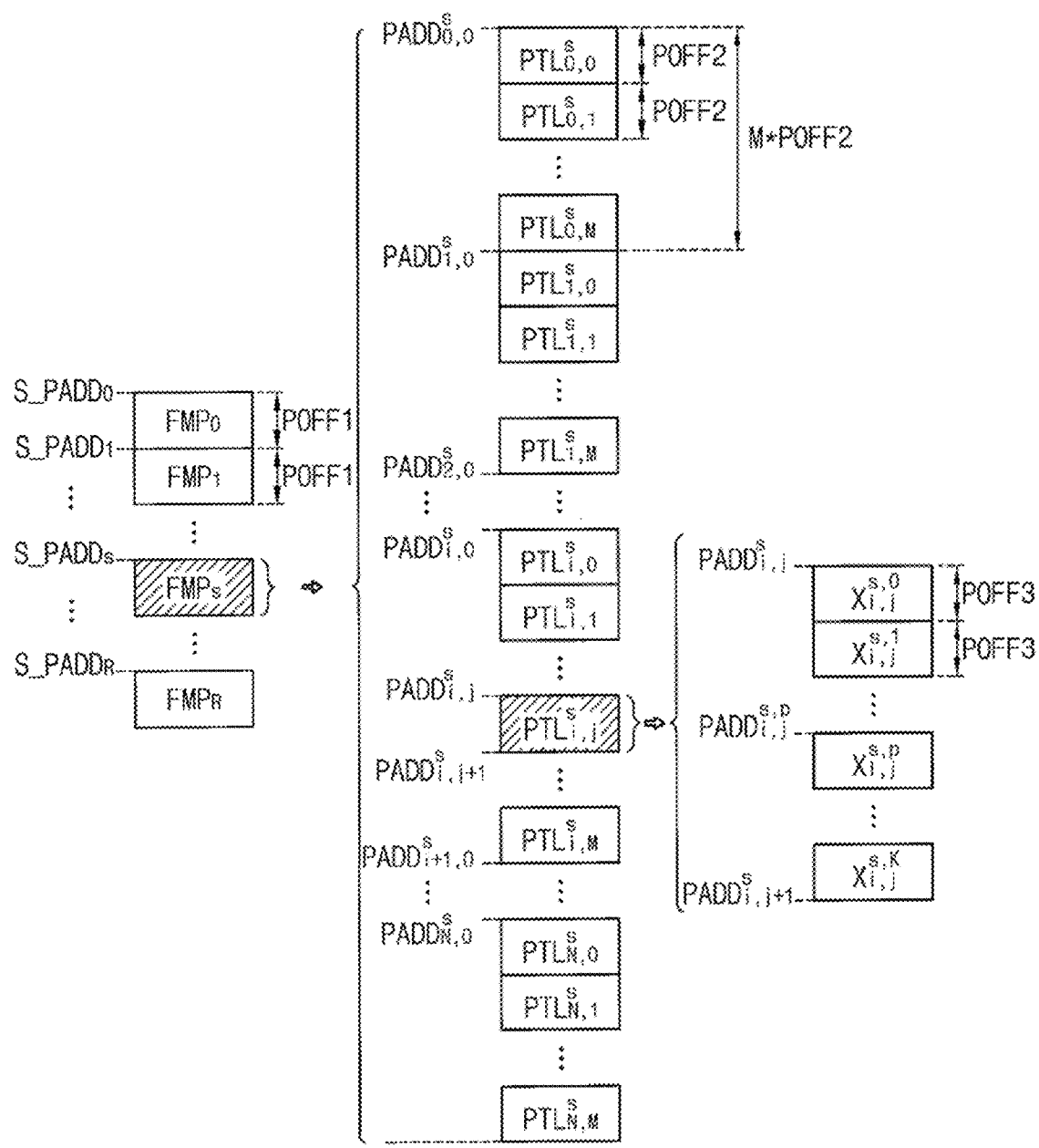
FIGS. 14 and 15 are diagrams illustrating addresses assigned to a feature point map and a descriptor map according to the storing order of FIG. 13.
Figure 15:
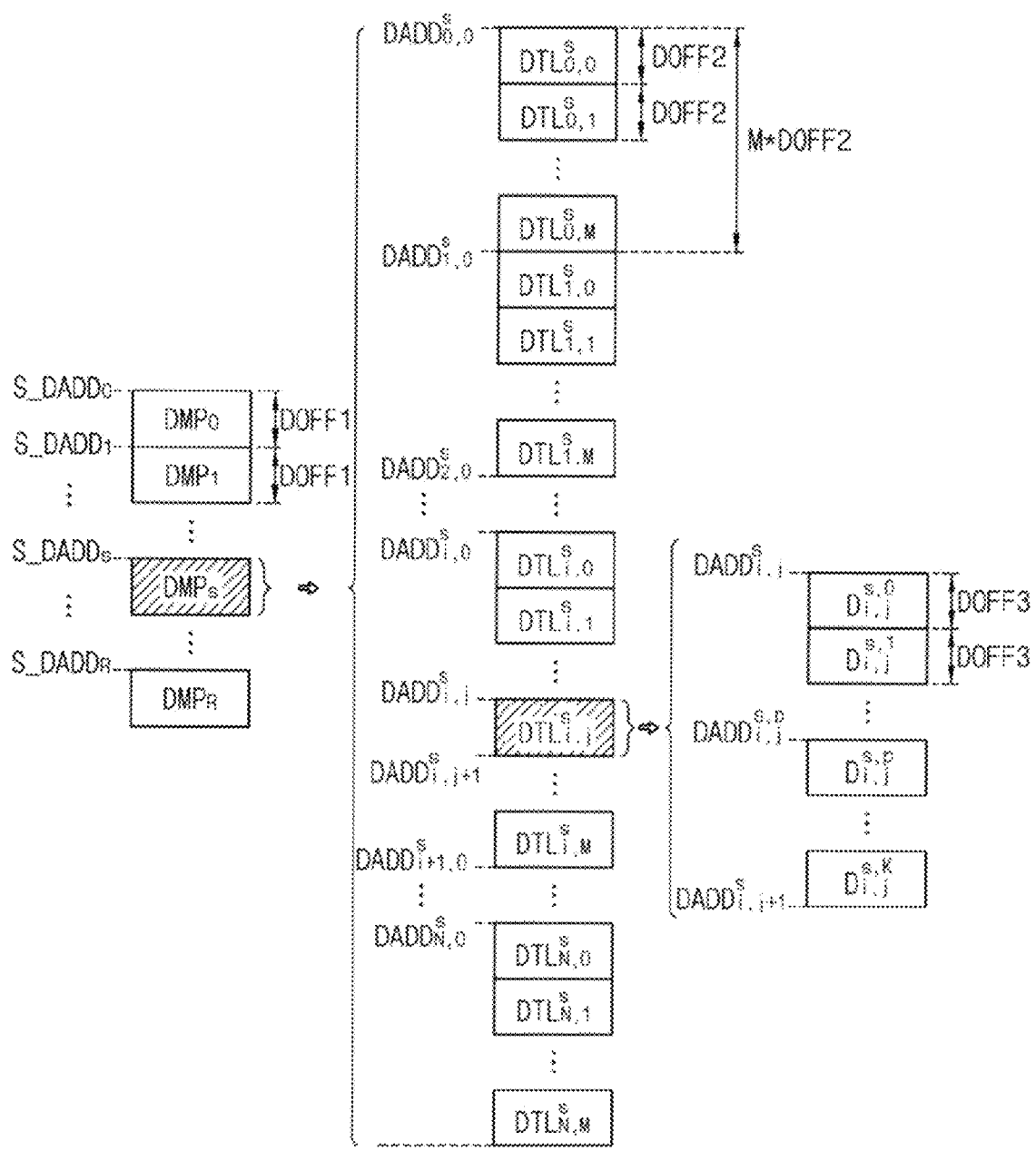

FIGS. 14 and 15 are diagrams illustrating addresses assigned to a feature point map and a descriptor map according to the storing order of FIG. 13.

Referring to FIG. 14, a plurality of feature point maps $FMP_0 \sim FMP_R$ may be sequentially stored at feature point start addresses $S\_PADD_0$~$S\_PADD_R$ of the memory device. An address offset POFF1 between the feature point start addresses $S\_PADD_0$~$S\_PADD_R$ may correspond to the number of data bits in each of the feature point maps $FMP_0$~$FMP_R$ and the address offset POFF1 may have the same value for each of the feature point maps $FMP_0$~$FMP_R$.

FIG. 14 illustrates an example of a plurality of feature point tiles $PTL_{0,0}^s$~$PTL_{N,M}^s$ corresponding to one feature point map FMPs. The address $PADD_{0,0}^s$ of the first feature point tile $PTL_{0,0}^s$ is the same as the feature point start address $S\_PADDs$ of the feature point map FMPs. As illustrated in FIG. 14, the plurality of feature point tiles $PTL_{0,0}^s$~$PTL_{N,M}^s$ in the feature point map FMPs corresponding to the input image Is may be sequentially stored in the memory device from the feature point start address $S\_PADDs = PADD_{0,0}^s$ one by one by a feature point tile address offset POFF2. The feature point tile address offset POFF2 may be determined based on a feature point tile size corresponding to the data bits included in each feature point tile.

As such, according to the storing order of row units, the address $PADD_{i,j}^s$ of each feature point tile $PTL_{i,j}^s$ may be determined based on the feature point start address $S\_PADDs = PADD_{0,0}^s$ corresponding to the input image Is and the feature point tile offset POFF2 as represented by Expression 3.

$$PADD_{i,j}^s = PADD_{0,0}^s + i*M*POFF2 + j*POFF2 \quad \text{Expression 3}$$

In Expression 3, M indicates the column number of the image tiles included in each input image, which may be the same as the column number of the feature point tiles included in each feature point map.

In addition, FIG. 14 illustrates as an example, a plurality of feature points $X_{i,j}^{s,0}$~$X_{i,j}^{s,K}$ corresponding to one feature point tile $PTL_{i,j}^s$. The address $PADD_{i,j}^s$ of the first feature point $X_{i,j}^{s,0}$ is the same as the start address of the feature point tile $PTL_{i,j}^s$. As illustrated in FIG. 14, the plurality of feature points $X_{i,j}^{s,0}$~$X_{i,j}^{s,K}$ in the feature point tile $PTL_{i,j}^s$ may be sequentially stored in the memory device from the start address $PADD_{i,j}^s$ one by one by an address offset POFF3.

Referring to FIG. 15, a plurality of descriptor maps $DMP_0$~$DMP_R$ may be sequentially stored at descriptor start addresses $S\_DADD_0$~$S\_DADD_R$ of the memory device. An address offset DOFF1 between the descriptor start addresses $S\_DADD_0$~$S\_DADD_R$ may correspond to the number of data bits in each of the descriptor maps $DMP_0$~$DMP_R$ and the address offset DOFF1 may have the same value for each of the descriptor maps $DMP_0$~$DMP_R$.

FIG. 15 illustrates, as an example, a plurality of descriptor tiles $DTL_{0,0}^s$~$DTL_{N,M}^s$ corresponding to one descriptor map DMPs. The address $DADD_{0,0}^s$ of the first descriptor tile $DTL_{0,0}^s$ is the same as the descriptor start address $S\_DADDs$ of the descriptor map DMPs. As illustrated in FIG. 15, the plurality of descriptor tiles $DTL_{0,0}^s$~$DTL_{N,M}^s$ in the descriptor map DMPs corresponding to the input image Is may be sequentially stored in the memory device from the descriptor start address $S\_DADDs$~$DADD_{0,0}^s$ one by one by a descriptor tile address offset DOFF2. The descriptor tile address offset DOFF2 may be determined based on a descriptor tile size corresponding to the data bits included in each descriptor tile.

As such, according to the storing order of row units, the address $DADD_{i,j}^s$ of each descriptor tile $DTL_{i,j}^s$ may be determined based on the descriptor start address $S\_DADDs$—$DTLs_{0,0}^s$ corresponding to the input image Is and the descriptor tile offset DOFF2 as represented by Expression 4.

$$DADD_{i,j}^s = DADD_{0,0}^s + i*M*DOFF2 + j*DOFF2 \quad \text{Expression 4}$$

In Expression 4, M indicates the column number of the image tiles included in each input image, which may be the same as the column number of the descriptor tiles included in each descriptor map.

In addition, FIG. 15 illustrates as an example, a plurality of descriptors $D_{i,j}^{s,0}$~$D_{i,j}^{s,K}$ corresponding to one descriptor tile $DTL_{i,j}^s$. The address $DADD_{i,j}^s$ of the first descriptor $D_{i,j}^{s,0}$ is the same as the start address of the descriptor tile $DADD_{i,j}^s$. As illustrated in FIG. 15, the plurality of descriptors $D_{i,j}^{s,0}$~$D_{i,j}^{s,K}$ in the descriptor tile $DTL_{i,j}^s$ may be sequentially stored in the memory device from the start address $DADD_{i,j}^s$ one by one by an address offset DOFF3.

As such, the addresses according to the storing order of row unit may satisfy the relations of Expression 3 and Expression 4. Accordingly, the descriptors for the similarity calculation may be read out from the memory device based on the descriptor start addresses $S\_DADD_0$~$S\_DADD_R$ and the descriptor tile address offset DOFF2 as will be described below with reference to FIGS. 16 and 17.

Figure 16:
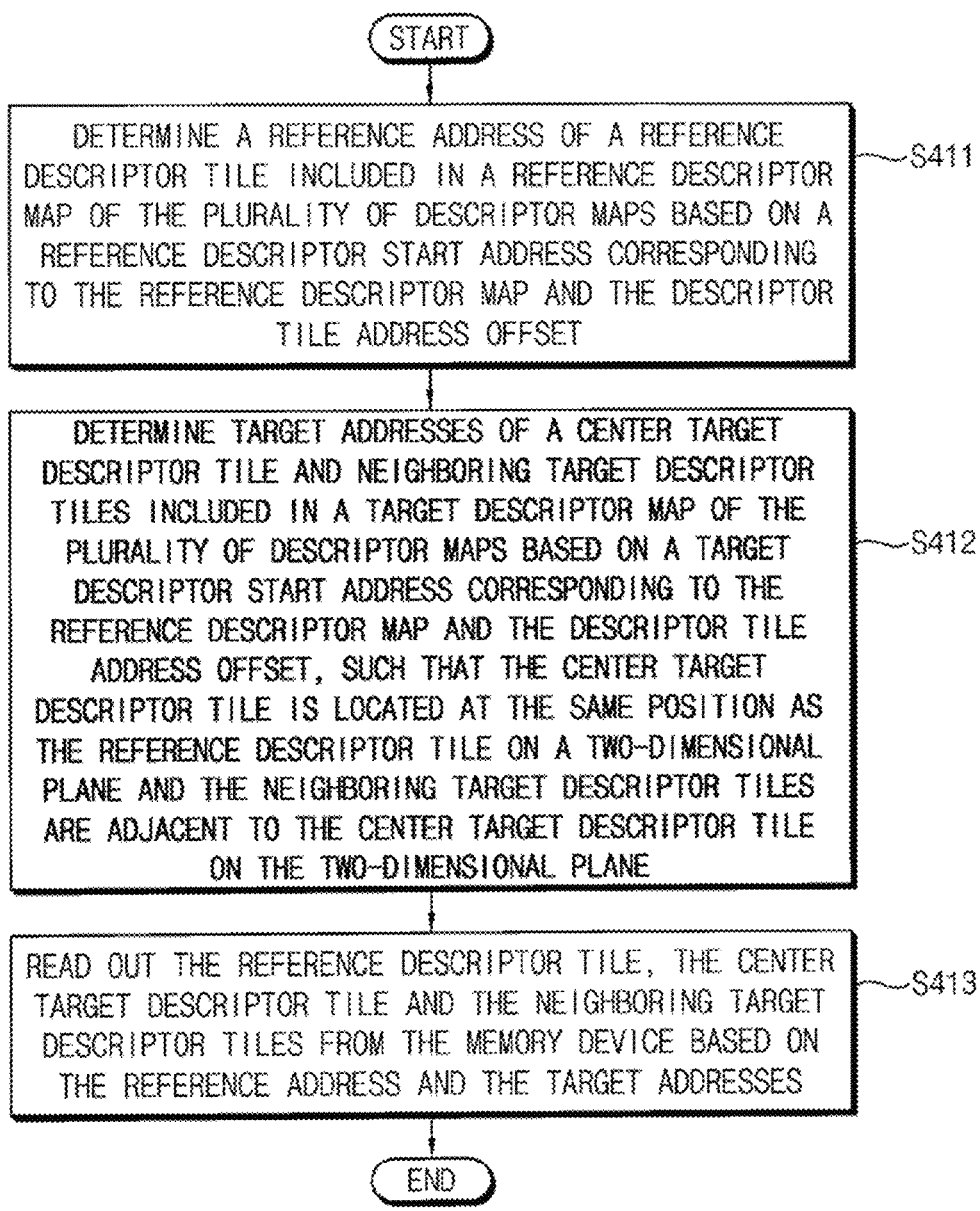
FIG. 16 is a flow chart illustrating an example embodiment of reading data by a method of matching images according to example embodiments.
Figure 17:
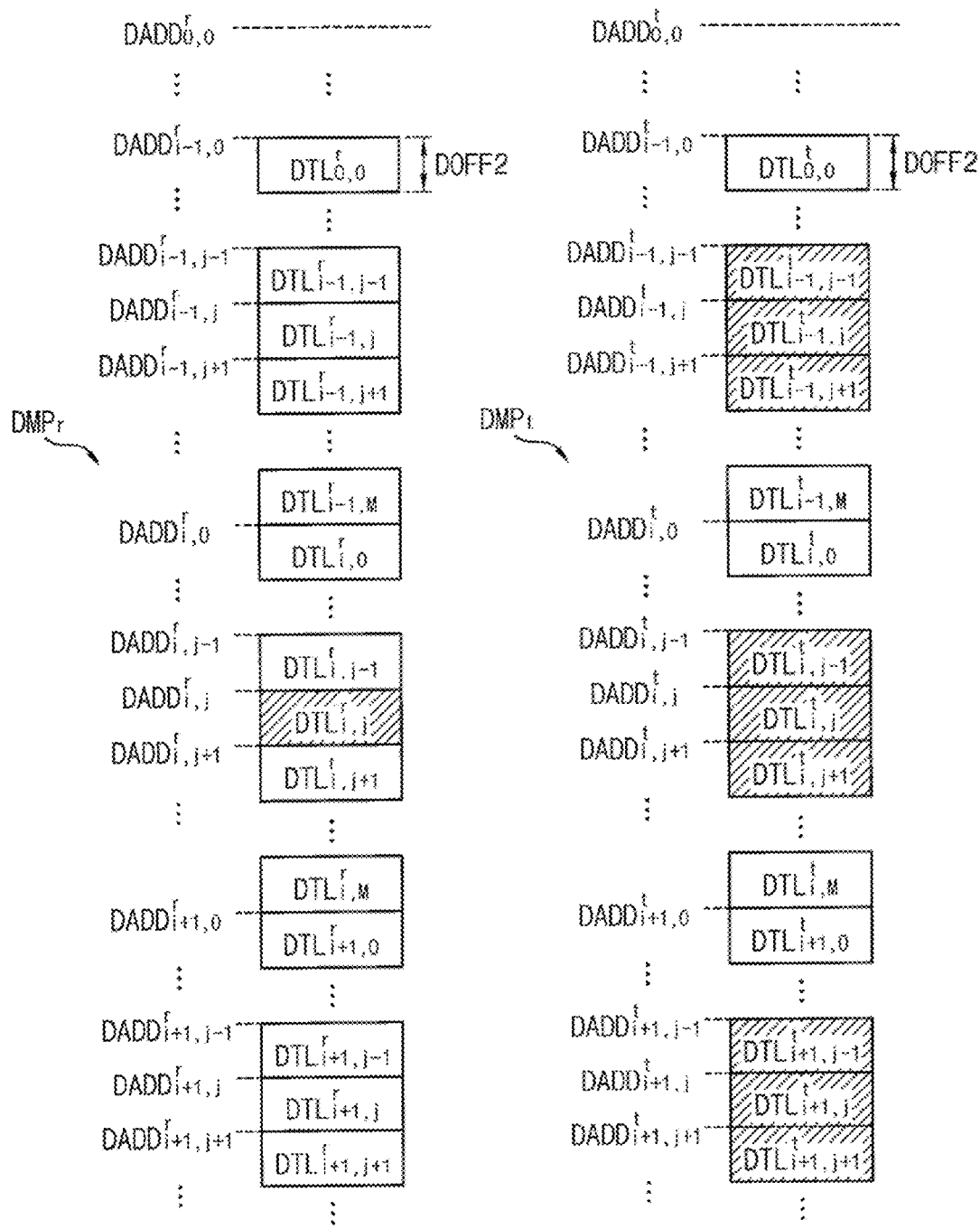
FIG. 17 is a diagram illustrating the data reading of FIG. 16.

FIG. 16 is a flow chart illustrating an example embodiment of reading data by a method of matching images according to example embodiments, and FIG. 17 is a diagram for describing the data reading of FIG. 16.

Referring to FIG. 16, a reference address of a reference descriptor tile included in a reference descriptor map of the plurality of descriptor maps may be determined based on a reference descriptor start address corresponding to the reference descriptor map and the descriptor tile address offset (S411).

Target addresses of a center target descriptor tile and neighboring target descriptor tiles included in a target descriptor map of the plurality of descriptor maps may be determined based on a target descriptor start address corresponding to the reference descriptor map and the descriptor tile address offset, such that the center target descriptor tile is located at the same position as the reference descriptor tile on a two-dimensional plane and the neighboring target descriptor tiles are adjacent to the center target descriptor tile on the two-dimensional plane (S412).

The reference descriptor tile, the center target descriptor tile and the neighboring target descriptor tiles may be read out from the memory device based on the reference address and the target addresses (S413).

FIG. 17 illustrates a reference descriptor map DMPr, a target descriptor map DMPt, and addresses corresponding to the reference descriptor map DMPr and the target descriptor map DMPt, which are stored in the memory device according to the storing order of row units as described with reference to FIGS. 13, 14 and 15. The reference descriptor map DMPr corresponds to one of the plurality of descriptor maps $DMP_0$~$DMP_R$, and the target descriptor map DMPt corresponds to another one of the plurality of descriptor maps $DMP_0$~$DMP_R$.

A reference address $DADD_{i,j}^r$ of a reference descriptor tile $DTL_{i,j}^r$ among a plurality of descriptor tiles $DTL_{0,0}^r$~$DTL_{N,M}^r$ included in the reference descriptor map DMPr may be determined as represented by Expression 5, based on the reference descriptor start address $DADD_{0,0}^r$ corresponding to the reference descriptor map DMPr and the descriptor tile address offset DOFF2 as described with reference to Expression 4.

$$DADD_{i,j}^r = DADD_{0,0}^r + i*M*DOFF2 + j*DOFF2 \quad \text{Expression 5}$$

In the same way, target addresses $DADD_{i-1,j-1}^t \sim DADD_{i+1,j+1}^t$ of a center target descriptor tile $DTL_{i,j}^t$ and neighboring target descriptor tiles $DTL_{i-j-1}^t$, $DTL_{i-1,j}^t$, $DTL_{i-1,j}^t$, $DTL_{i,j-1}^t$, $DTL_{i,j+1}^t$, $DTL_{i+1,j-1}^t$, $DTL_{i+1,j}^t$, and $DTL_{i+1,j+1}^t$ may be determined as represented by Expression 6, based on the target descriptor start address $DADD_{0,0}^t$ corresponding to the target descriptor map DMPt and the descriptor tile address offset DOFF2

$$DADD_{i,j}^r = DADD_{0,0}^r + i*M*DOFF2 + j*DOFF2 \quad \text{Expression 6}$$

$$DADD_{i-1,j-1}^t =$$
$$\quad DADD_{0,0}^t + (i-1)*M*DOFF2 + (j-1)*DOFF2$$
$$DADD_{i-1,j}^t = DADD_{0,0}^t + (i-1)*M*DOFF2 + j*DOFF2$$
$$DADD_{i-1,j+1}^t =$$
$$\quad DADD_{0,0}^t + (i-1)*M*DOFF2 + (j+1)*DOFF2$$
$$DADD_{i,j-1}^t = DADD_{0,0}^t + i*M*DOFF2 + (j-1)*DOFF2$$
$$DADD_{i,j}^t = DADD_{0,0}^t + i*M*DOFF2 + j*DOFF2$$
$$DADD_{i,j+1}^t = DADD_{0,0}^t + i*M*DOFF2 + (j+1)*DOFF2$$
$$DADD_{i+1,j-1}^t =$$
$$\quad DADD_{0,0}^t + (i+1)*M*DOFF2 + (j-1)*DOFF2$$
$$DADD_{i+1,j}^t = DADD_{0,0}^t + (i+1)*M*DOFF2 + j*DOFF2$$
$$DADD_{i+1,j+1}^t =$$
$$\quad DADD_{0,0}^t + (i+1)*M*DOFF2 + (j+1)*DOFF2$$

The address generator 110 in FIG. 2 may generate the reference address $DADD_{i,j}^r$ and the target addresses $DADD_{i-1,j-1}^t \sim DADD_{i+1,j+1}^t$ according to the storing order of row units and provide the reference address and the target addresses as the access addresses ACCAD to the memory device 30. The reference descriptor tile $DTL_{i,j}^r$, the center target descriptor tile $DTL_{i,j}^t$ and the neighboring target descriptor tiles $DTL_{i-j-1}^t$, $DTL_{i-1,j}^t$, $DTL_{i-1,j}^t$, $DTL_{i,j-1}^t$, $DTL_{i,j+1}^t$, $DTL_{i+1,j-1}^t$, $DTL_{i+1,j}^t$, and $DTL_{i+1,j+1}^t$ may be read out from the memory device and loaded to the descriptor map buffer 310, based on the reference address $DADD_{i,j}^r$ and the target addresses $DADD_{i-1,j-1}^t \sim DADD_{i+1,j+1}^t$.

The matcher 320 in FIG. 2 may determine similarities between a reference descriptor included in the reference descriptor tile $DTL_{i,j}^r$ and target descriptors included in the center target descriptor tile $DTL_{i,j}^t$ and the neighboring target descriptor tiles $DTL_{i-j-1}^t$, $DTL_{i-1,j}^t$, $DTL_{i-1,j}^t$, $DTL_{i,j-1}^t$, $DTL_{i,j+1}^t$, $DTL_{i+1,j-1}^t$, $DTL_{i+1,j}^t$, and $DTL_{i+1,j+1}^t$. The matcher 320 may determine a feature point matched to a reference feature point corresponding to the reference descriptor from among target feature points corresponding to the target descriptors based on the similarities.

As such, the data for the pixel positions of the feature points and the corresponding descriptors may be accessed by parsing or processing the addresses, and the corresponding pairs of the feature points may be estimated efficiently. Further, through such address processing, the efficient access to the information may be implemented in the processes of removing the pairs of the feature points of the low correspondence and the homography operations.

Figure 18:
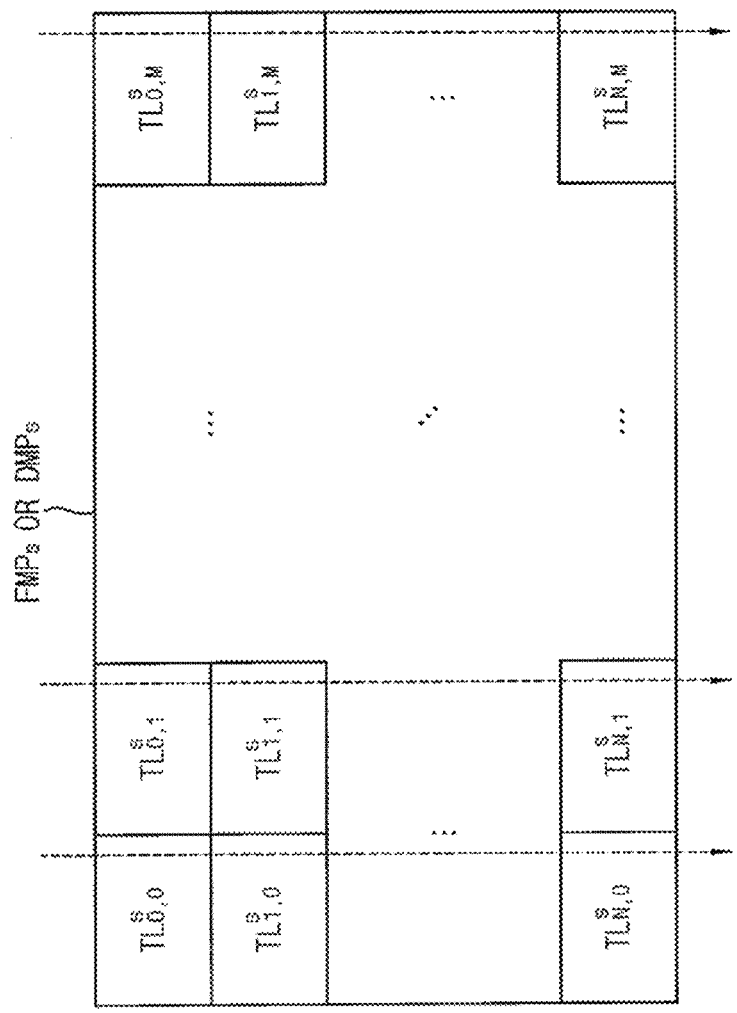
FIG. 18 is a diagram illustrating an example embodiment of storing a feature point map and a descriptor map by a method of matching images according to example embodiments.

FIG. 18 is a diagram illustrating an example embodiment of storing a feature point map and a descriptor map by a method of matching images according to example embodiments.

Referring to FIG. 18, according to a storing order of column units, a plurality of tiles $TL_{0,0}^s \sim TL_{N,M}^s$ included in a feature point map FMPs or a descriptor map DMPs may be sequentially stored in a memory device. The plurality of tiles $TL_{0,0}^s \sim TL_{N,M}^s$ may be a plurality of feature point tiles included in the feature point map FMPs or a plurality of descriptor tiles included in the descriptor map DMPs.

According to a storing order of column units, the tiles $TL_{0,0}^s \sim TL_{N,0}^s$ of the first column may be stored at the sequentially increasing addresses of the memory device, the tiles $TL_{0,1}^s \sim TL_{N,1}^s$ of the second column may be stored at the sequentially increasing addresses of the memory device, and similarly the tiles $TL_{0,M}^s \sim TL_{N,M}^s$ of the last column may be stored at the sequentially increasing addresses of the memory device.

Figure 19:
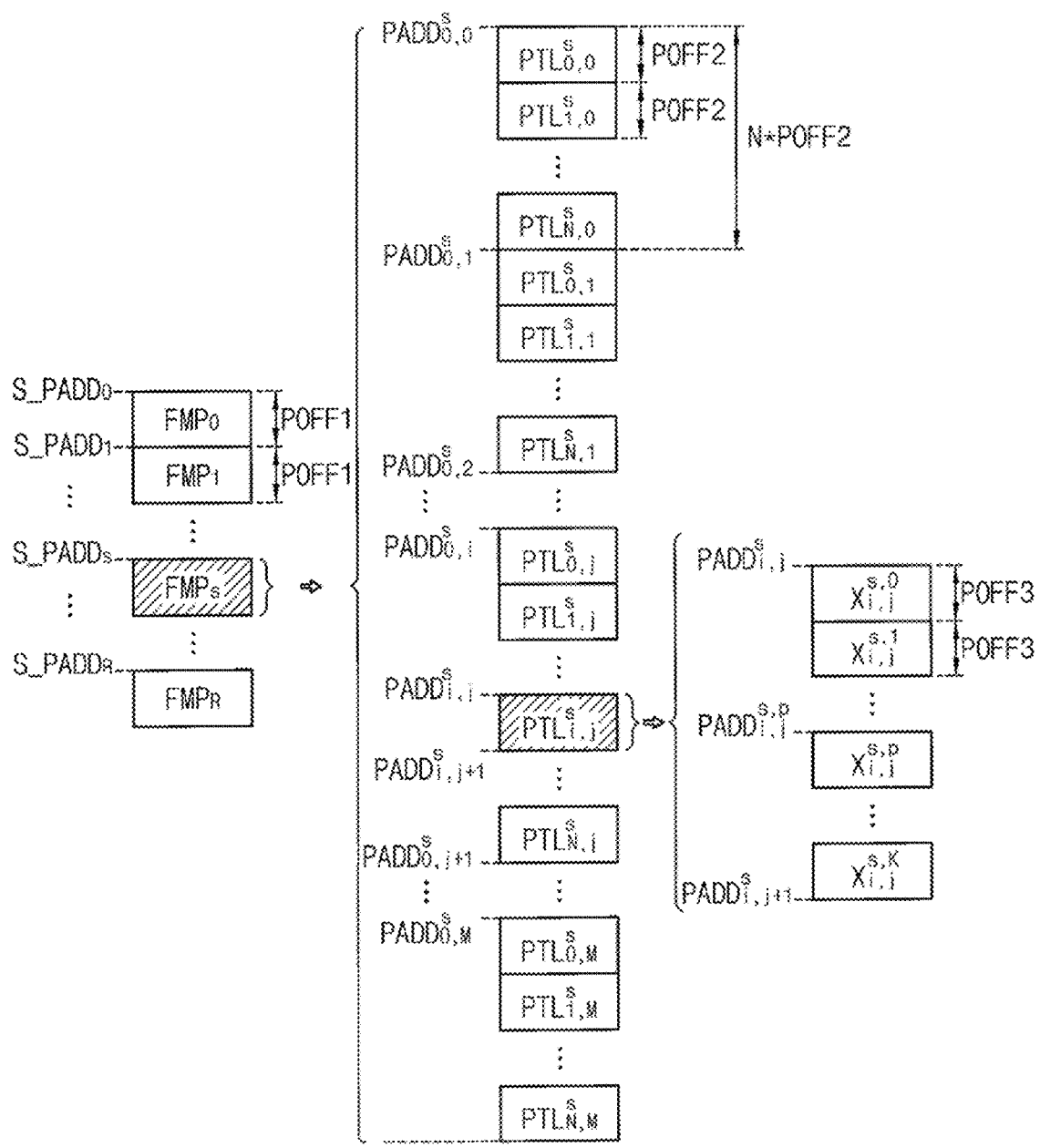
FIGS. 19 and 20 are diagrams illustrating addresses assigned to a feature point map and a descriptor map according to the storing order of FIG. 18.
Figure 20:
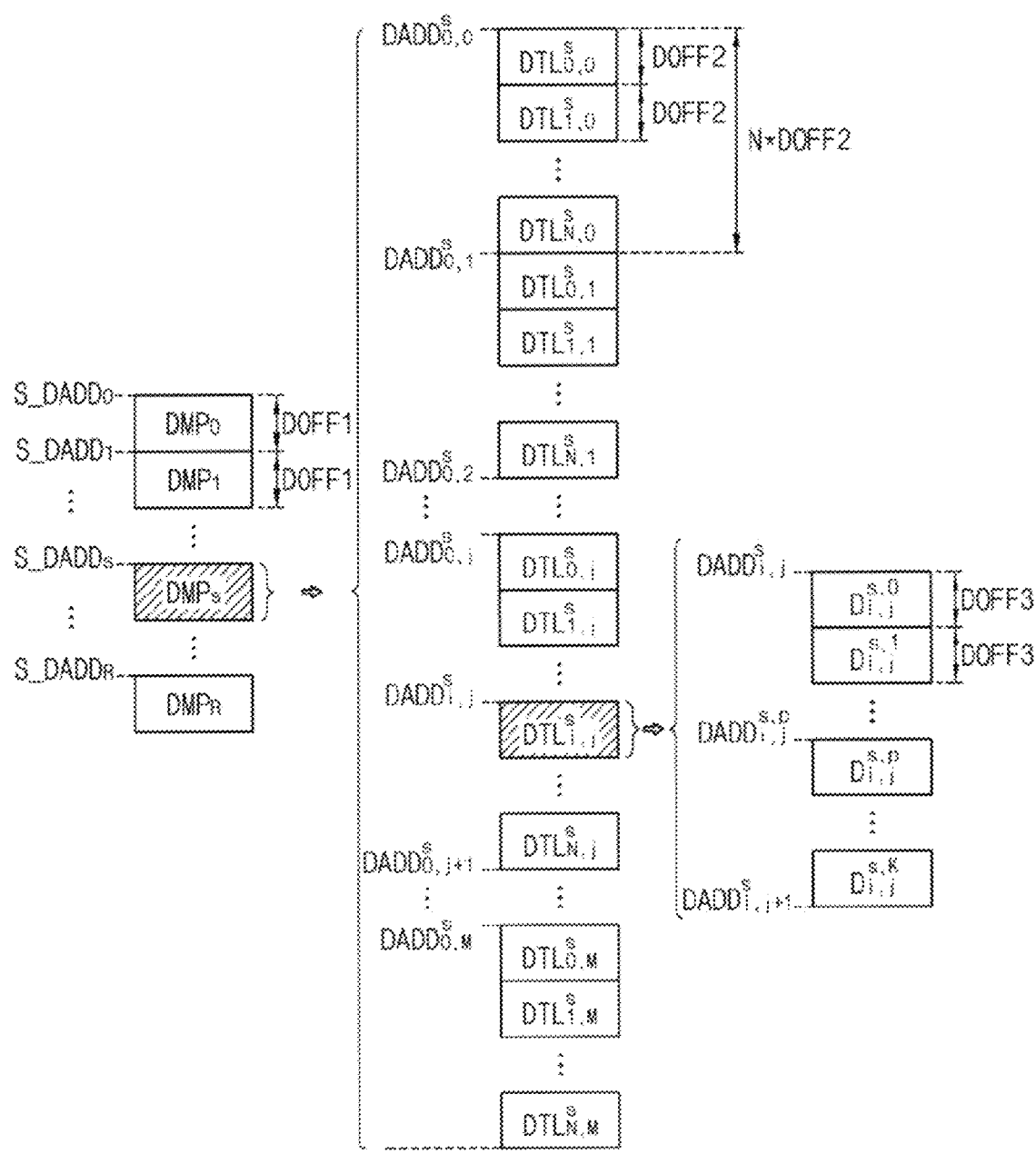

FIGS. 19 and 20 are diagrams illustrating addresses assigned to a feature point map and a descriptor map according to the storing order of FIG. 18.

Referring to FIG. 19, a plurality of feature point maps $FMP_0 \sim FMP_R$ may be sequentially stored at feature point start addresses $S\_PADD_0 \sim S\_PADD_R$ of the memory device. An address offset POFF1 between the feature point start addresses $S\_PADD_0 \sim S\_PADD_R$ may correspond to the number of data bits in each of the feature point maps $FMP_0 \sim FMP_R$ and the address offset POFF1 may have the same value for each of the feature point maps $FMP_0 \sim FMP_R$.

FIG. 19 illustrates, as an example, a plurality of feature point tiles $PTL_{0,0}^s \sim PTL_{N,M}^s$ corresponding to one feature point map FMPs. The address $PADD_{0,0}^s$ of the first feature point tile $PTU_{0,0}^s$ is the same as the feature point start address S_PADDs of the feature point map FMPs. As illustrated in FIG. 19, the plurality of feature point tiles $PTL_{0,0}^s \sim PTL_{N,M}^s$ in the feature point map FMPs corresponding to the input image Is may be sequentially stored in the memory device from the feature point start address S_PADDs~$PADD_{0,0}^s$ one by one by a feature point tile address offset POFF2. The feature point tile address offset POFF2 may be determined based on a feature point tile size corresponding to the data bits included in each feature point tile.

As such, according to the storing order of column units, the address $PADD_{i,j}^s$ of each feature point tile $PTL_{i,j}^s$ may be determined based on the feature point start address S_PADDs=$PADD_{0,0}^s$ corresponding to the input image Is and the feature point tile offset POFF2 as represented by Expression 7.

$$PADD_{i,j}^s = PADD_{0,0}^s + j*N*POFF2 + i*POFF2 \quad \text{Expression 7}$$

In Expression 7, N indicates the row number of the image tiles included in each input image, which may be the same as the row number of the feature point tiles included in each feature point map.

In addition, FIG. 19 illustrates as an example, a plurality of feature points $X_{i,j}^{s,0} \sim X_{i,j}^{s,K}$ corresponding to one feature point tile $PTL_{i,j}^s$. The address $PADD_{i,j}^s$ of the first feature point $X_{i,j}^{s,0}$ is the same as the start address of the feature point tile $PTL_{i,j}^s$. As illustrated in FIG. 19, the plurality of feature points $X_{i,j}^{s,0} \sim X_{i,j}^{s,K}$ in the feature point tile $PTL_{i,j}^s$ may be sequentially stored in the memory device from the start address $PADD_{i,j}^s$ one by one by an address offset POFF3.

Referring to FIG. 20, a plurality of descriptor maps $DMP_0 \sim DMP_R$ may be sequentially stored at descriptor start addresses $S\_DADD_0 \sim S\_DADD_R$ of the memory device. An address offset DOFF1 between the descriptor start addresses $S\_DADD_0 \sim S\_DADD_R$ may correspond to the number of data bits in each of the descriptor maps $DMP_0 \sim DMP_R$ and the address offset DOFF1 may have the same value for each of the descriptor maps $DMP_0 \sim DMP_R$.

FIG. 20 illustrates, as an example, a plurality of descriptor tiles $DTLs_{0,0} \sim DTL_{N,M}^s$ corresponding to one descriptor map DMPs. The address $DADD_{0,0}^s$ of the first descriptor tile $DTL_{0,0}^s$ is the same as the descriptor start address $S\_DADDs$ of the descriptor map DMPs. As illustrated in FIG. 20, the plurality of descriptor tiles $DTL_{0,0}^s \sim DTL_{N,M}^s$ in the descriptor map DMPs corresponding to the input image Is may be sequentially stored in the memory device from the descriptor start address $S\_DADDs = DADD_{0,0}^s$ one by one by a descriptor tile address offset DOFF2. The descriptor tile address offset DOFF2 may be determined based on a descriptor tile size corresponding to the data bits included in each descriptor tile.

As such, according to the storing order of column units, the address $DADD_{i,j}^s$ of each descriptor tile $DTL_{i,j}^s$ may be determined based on the descriptor start address $S\_DADDs = DTL_{0,0}^s$ corresponding to the input image Is and the descriptor tile offset DOFF2 as represented by Expression 8.

$$DADD_{i,j}^s = DADD_{0,0}^s + j*N*DOFF2 + i*DOFF2 \quad \text{Expression 8}$$

In Expression 8, N indicates the row number of the image tiles included in each input image, which may be the same as the row number of the descriptor tiles included in each descriptor map.

In addition, FIG. 20 illustrates as an example, a plurality of descriptors $D_{i,j}^{s,0} \sim D_{i,j}^{s,K}$ corresponding to one descriptor tile $DTL_{i,j}^s$. The address $DADD_{i,j}^s$ of the first descriptor $D_{i,j}^{s,0}$ is the same as the start address of the descriptor tile $DADD_{i,j}^s$. As illustrated in FIG. 15, the plurality of descriptors $D_{i,j}^{s,0} \sim D_{i,j}^{s,K}$ in the descriptor tile $DTL_{i,j}^s$ may be sequentially stored in the memory device from the start address $DADD_{i,j}^s$ one by one by an address offset DOFF3.

As such, the addresses according to the storing order of column unit may satisfy the relations of Expression 7 and Expression 8. Accordingly, the descriptors for the similarity calculation may be read out from the memory device based on the descriptor start addresses $S\_DADD_0 \sim S\_DADD_R$ and the descriptor tile address offset DOFF2 in the same way as described below with reference to FIGS. 16 and 17.

Figure 21:
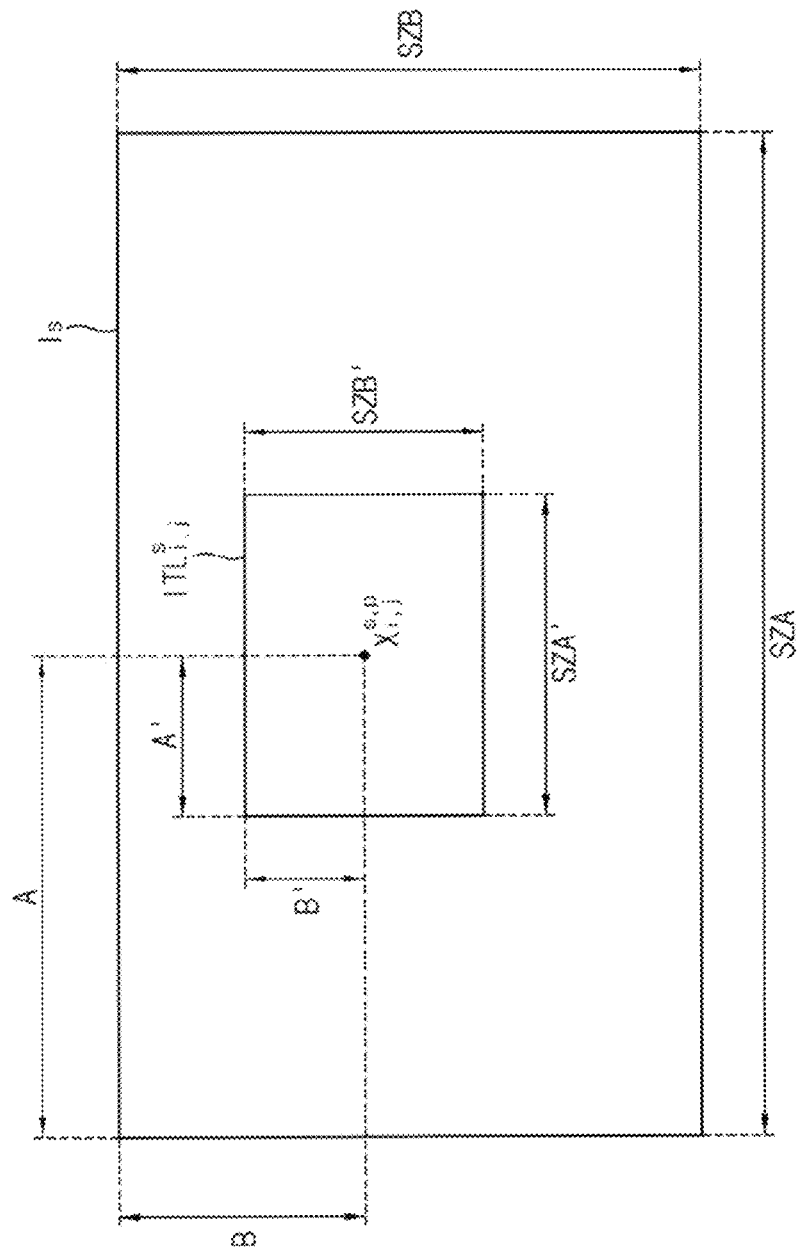
FIG. 21 is a diagram illustrating coordinates of a feature point by a method of matching images according to example embodiments.

FIG. 21 is a diagram illustrating coordinates of a feature point by a method of matching images according to example embodiments.

As described with reference to Expression 1, the number N of the rows of the image tiles included in each input image Is may be determined by the row size SZA of each input image Is and the row size SZA' of each image tile $ITL_{i,j}^s$. In the same way, the number M of the columns of the image tiles included in each input image Is may be determined by the column size SZB of each input image Is and the column size SZB' of each image tile $ITL_{i,j}^s$.

In some example embodiments, a position of a feature point $X_{i,j}^{s,p}$ may be represented by (A,B) in each input image Is. In other example embodiments, the position of a feature point $X_{i,j}^{s,p}$ may be represented by (A', B') in each image tile $X_{i,j}^{s,p}$. The position of each image tile $ITL_{i,j}^s$ may be determined by the tile row index i and the tile column index j, and one of (A,B) and (A', B') may be calculation from the other one of (A,B) and (A', B'). When the position of the feature point $X_{i,j}^{s,p}$ is represented by (A', B') in each image tile IT'LL, the size of the above-described feature point map and the processing time for image matching may be further decreased by reducing the access time to the memory device.

Figure 22:
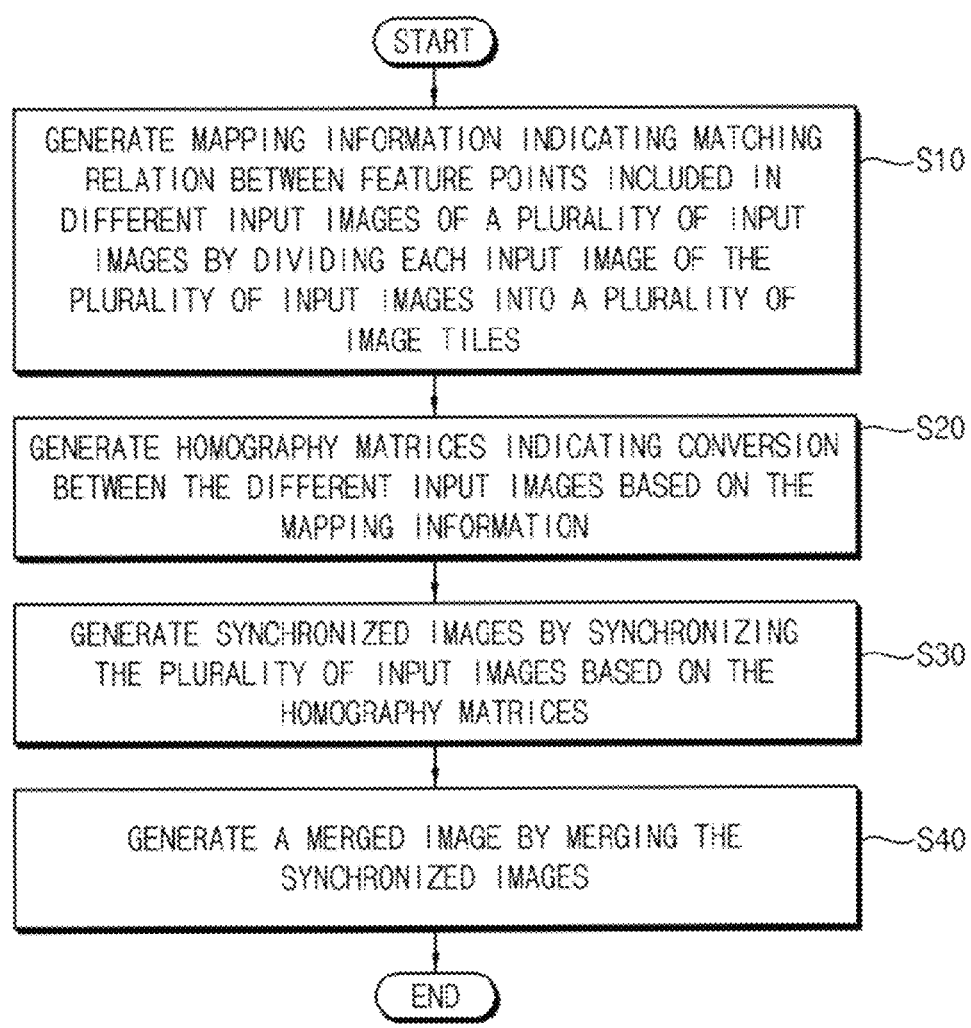
FIG. 22 is a flow chart illustrating a method of merging images according to example embodiments.

FIG. 22 is a flow chart illustrating a method of merging images according to example embodiments.

Referring to FIG. 22, mapping information containing matching relationships between feature points included in different input images of a plurality of input images may be generated by dividing each input image of the plurality of input images into a plurality of image tiles (S10). The mapping information may be generated efficiently by dividing each input image into the plurality of image tiles and using the feature point map and the descriptor map as described above.

Homography matrices for conversion between the different input images may be generated based on the mapping information (S20). Synchronized images may be generated by synchronizing the plurality of input images based on the homography matrices (S30), and a merged image may be generated by merging the synchronized images (S40).

Hereinafter, generating the merged image based on the mapping information will be described below with reference to FIGS. 23A through 26, but example embodiments are not necessarily limited thereto.

FIGS. 23A through 23D are diagram illustrating image transformations used by a method of merging images according to example embodiments.

Figure 23A:
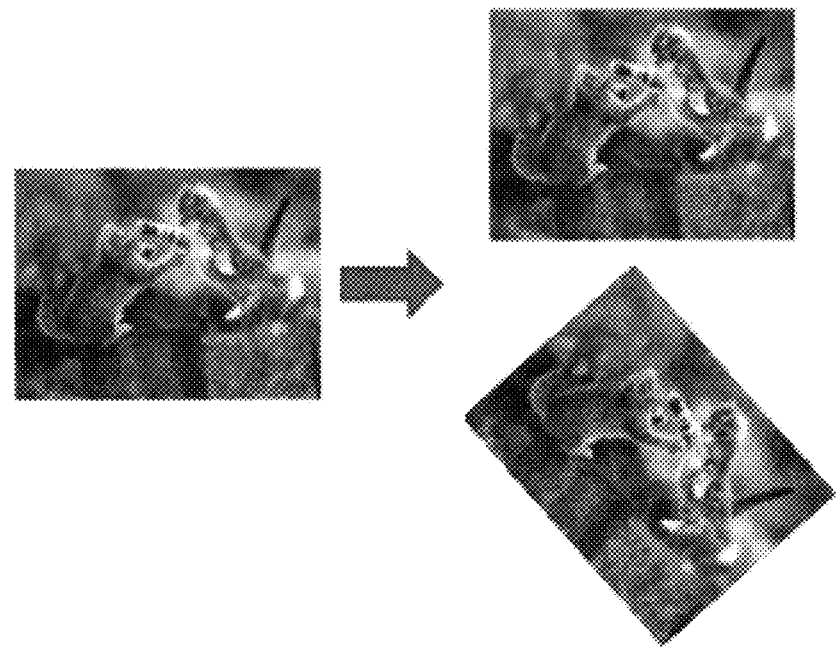
FIGS. 23A through 23D are diagrams illustrating image transformations used by a method of merging images according to example embodiments.

FIGS. 23A through 2313 are diagram illustrating image transformations used by a method of merging images according to example embodiments.

Image transformation may include obtaining a converted or modified image by applying a specific function of algorithm to a given image, for example, by applying translation, rotation, scaling conversion and/or respective conversion to the given image.

Figure 23B:
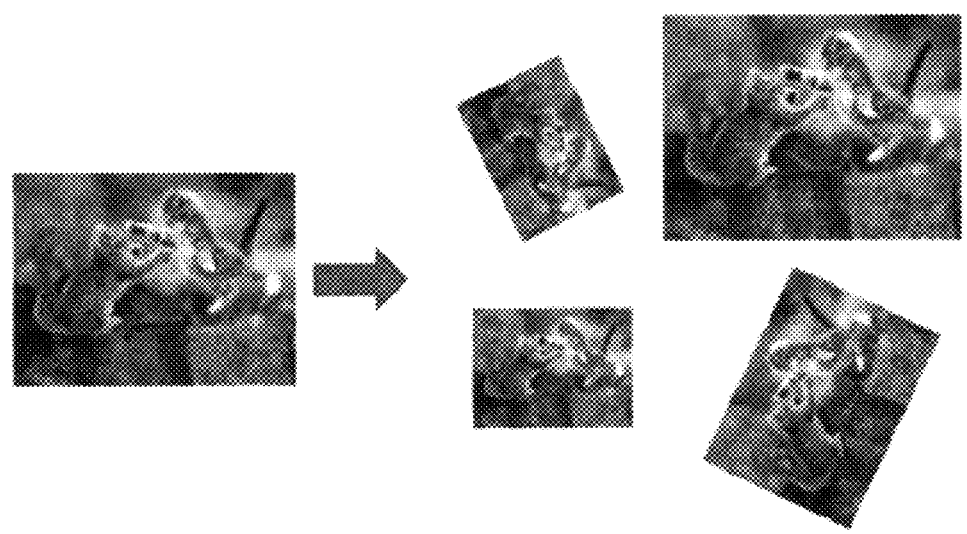
Figure 23C:
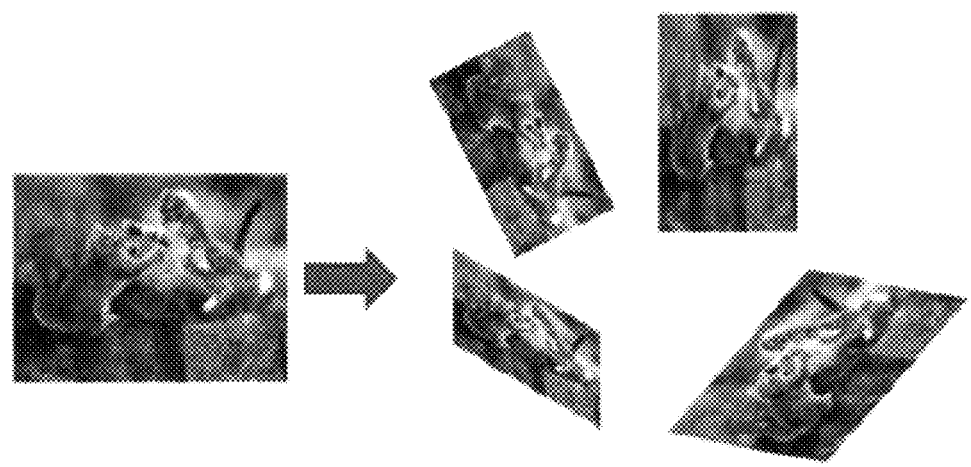
Figure 23D:
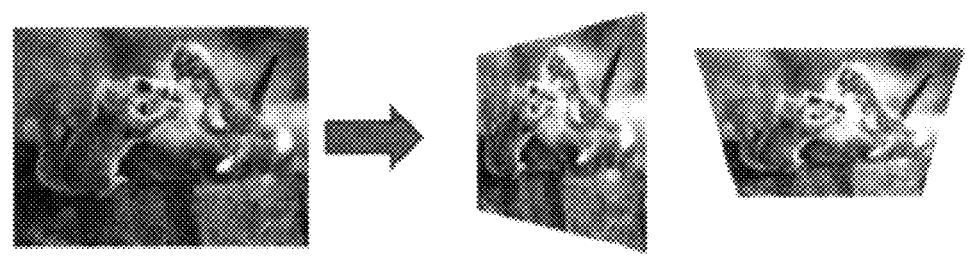

The image transformation may include a rigid transformation as illustrated in FIG. 23A, a similarity transformation as illustrated in FIG. 23B, an affine transformation as illustrated in FIG. 23C, a projective transformation as illustrated in FIG. 23D, and others. Converted or transformed coordinates (x',y') may be obtained by applying such image transformation to original coordinates (x,y).

The rigid transformation of FIG. 23A is a fundamental image transformation that fixes a magnitude of an image. In other words, only the translation and the rotation may be performed by the rigid transformation.

The similarity transformation of FIG. 23B further reflects the change of the magnitude or scale of the object and the shape of the object is conserved by the similarity transformation.

The Affine transformation of FIG. 23C adds feature of linearity conservation to the similarity transformation. Accordingly, parallelism of lines, ratio of length or distance may be conserved by the Affine transformation.

The projective transformation of FIG. 23D is a transformation to project an image of a 3D space to an image of a 2D space. The projective transformation may include conversion between two images viewed from two different perspective points in the 3D space.

A matrix representing the image transformation between two images is referred to as a homography matrix or simply a homography. A relation representing a general projective transformation may be obtained to transform a first image to a second image or vice versa, and the relation is a transformation matrix that is called a homography matrix.

In image processing, two images that are captured by two different perspective viewpoints or two different time points may require image transformation. The magnitude of the required homography is 3×3. The homography may be determined if eight values are given. In other words, at least four pairs of corresponding points are required to determine the homography.

FIG. 24 is a diagram for describing a homography matrix used by a method of merging images according to example embodiments.

FIG. 24 illustrates a process of obtaining a homography matrix H corresponding to one pair of points X(u, v, 1) and X'(u', v', 1) respectively included in two different images.

The homography matrix H may be determined by obtaining components h1~h9 of the homography matrix H.

As illustrated in FIG. 24, the relation of HX=X' may be transformed to the relation of Ah=0 and the component vector h may be obtained. In some examples, with respect to one pair of corresponding points, the matrix A has a magnitude of 3*9, and the matrix A has a magnitude of 3n*9 with respect to n pairs of corresponding points.

Figure 25:
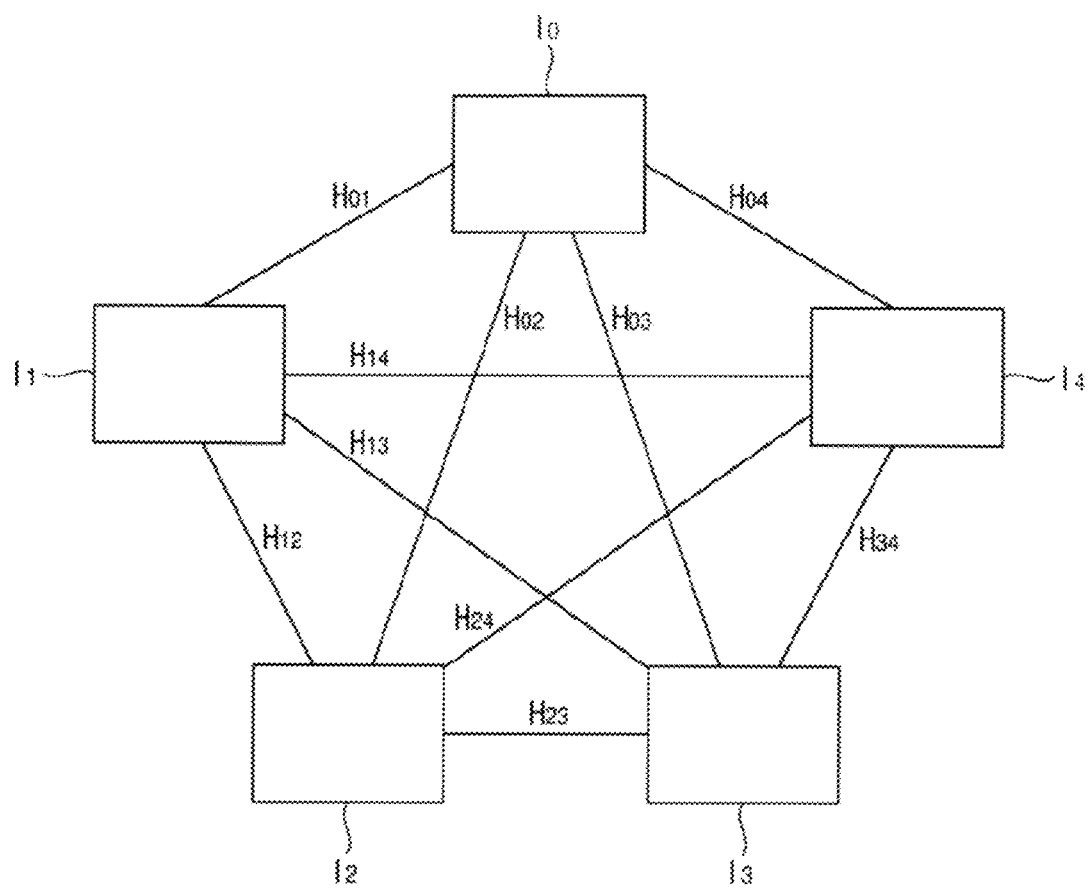
FIG. 25 is a diagram illustrating homography matrices between a plurality of input images.
Figure 26:
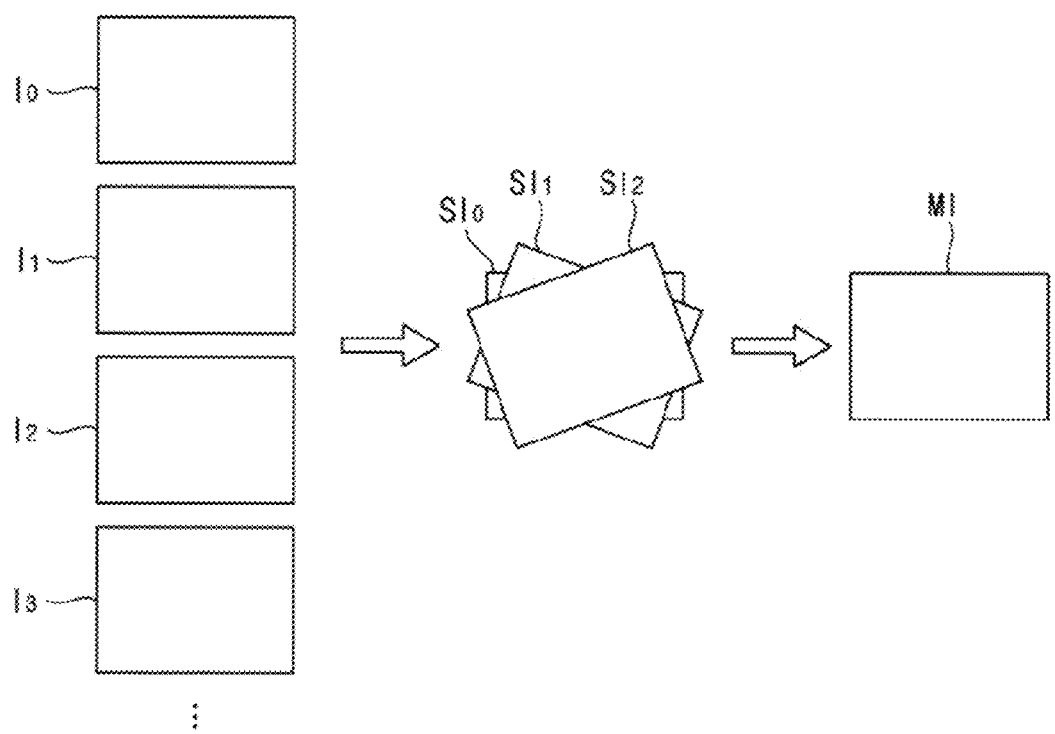
FIG. 26 is a diagram illustrating a procedure of merging images.

FIG. 25 is a diagram illustrating homography matrices between a plurality of input images, and FIG. 26 is a diagram illustrating a procedure of merging images.

Referring to FIG. 25, when first through fifth input images I0~I4 are to be merged, homography matrices Hij (i=0~4, j=0~4) may correspond to respective transformations between every two different input images Ii and Ij. Hij indicates the homography matrix to transform the coordinates in the i-th input image Ii to the coordinates aligned to a two-dimensional plane corresponding to the j-th image Ij. Hji is an inverse matrix of Hij and redundant matrices are omitted in FIG. 11.

As such, a homography matrix indicating transformation between two input images may be determined based on the matching information of the feature points included in the two input images (S20 in FIG. 22).

Referring to FIG. 26, synchronized images $SI_0$~$SI_2$ may be generated by synchronizing a plurality of input images $I_0$~$I_3$ based on the homography matrices (S30 in FIG. 22) as described with reference to FIGS. 23A through 25. One or more of the input images $I_0$~$I_3$ may be noise images and additionally or alternatively supplied for noise reduction, and thus the number of the synchronized images $SI_0$~$SI_2$ may be smaller than the number of the input images $I_0$~$I_3$.

A merged image MI may be generated by merging the synchronized images $SI_0$~$SI_2$ (S40 in FIG. 22).

In some example embodiments, image stitching may be performed using the synchronized images $SI_0$~$SI_2$ to generate the merged image MI. Boundaries of stitched portions may be sharpened during the stitching process due to alignment error or exposure deviation between the synchronized images $SI_0$~$SI_2$, and image blending may be performed to smooth the sharpened boundaries. The image stitching may be performed using the multiple synchronized images $SI_0$~$SI_2$ to minimize the boundaries and thus the merged image MI may be obtained. In some example embodiments, the merged image MI of a high dynamic range (HDR) may be generated using the multiple synchronized images $SI_0$~$SI_2$.

The merging of the synchronized images $SI_0$~$SI_2$ may be implemented using various schemes such as image stitching, noise reduction, HDR conversion, etc. and example embodiments are not limited thereto.

Figure 27:
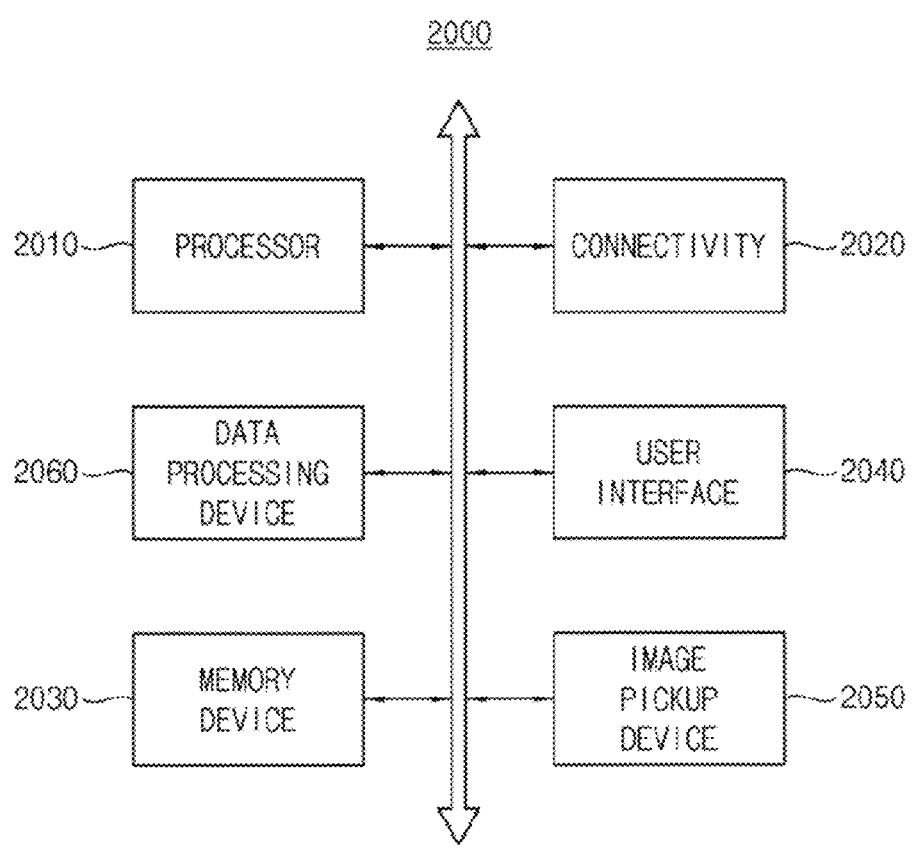
FIG. 27 is a block diagram illustrating an electronic system according to example embodiments.

FIG. 27 is a block diagram illustrating an electronic system according to example embodiments.

Referring to FIG. 27, an electronic system 2000 may include a processor 2010, a connectivity device 2020, a memory device 2030, a user interface 2040, a data processing device 2060 and an image pickup device 2050. Further, the electronic system 2000 may include a power supply.

The processor 2010 may perform various computational functions, e.g., particular calculations and tasks. The connectivity device 2020 may communicate with an external device. The memory device 2030 may operate as a data storage for data processed by the processor 2010 and the data processing device 2060. The user interface 2040 may include at least one input device, e.g., a keypad, a button, a microphone, a touch screen, etc., and/or at least one output device, e.g., a speaker, or a display device, etc. The power supply may provide power to the electronic system 2000.

The image pickup device 2050 and the data processing device 2060 may be controlled by the processor 2010. The image pickup device 2050 may provide input images to the data processing device 2060. For example, the image pickup device 2050 may include a complementary metal oxide semiconductor (CMOS) image sensor, a charged coupled device (CCD) image sensor, etc. The data processing device 2060 may be the data processing device of FIG. 2, and may perform the image matching and image merging according to example embodiments as described with reference to FIGS. 1 through 26.

As described above, the method of matching images and the data processing device performing the method according to example embodiments may enhance image merging performance by dividing the input image into the plurality of image tiles to increase distribution uniformity of the feature points. In addition, the image merging performance may be further enhanced by reducing processing amount and processing time for image matching using the feature point map and the descriptor map corresponding to the plurality of image tiles.

The inventive concept may be applied to any electronic devices and systems requiring image processing. For example, the inventive concept may be applied to systems such as a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, an automotive camera, a medical camera, etc.

The foregoing is illustrative of example embodiments and is not to be construed as limiting thereof. Although a few example embodiments have been described, those skilled in the art will readily appreciate that many modifications are possible in the example embodiments without materially departing from the present inventive concept.

What is claimed is:

1. A method of matching images, comprising:
dividing each input image of a plurality of input images into a plurality of image tiles;

generating a feature point map by extracting feature points from each image tile in the plurality of image tiles, wherein the feature point map includes a plurality of feature point tiles corresponding to the plurality of image tiles;

generating a descriptor map by generating descriptors of feature points from the feature point map, wherein the descriptor map includes a plurality of descriptor tiles corresponding to the plurality of feature point tiles; and generating mapping information containing matching relationships between the feature points in different input images of the plurality of input images based on a plurality of descriptor maps corresponding to the plurality of input images, wherein generating the mapping information includes:

determining a reference descriptor tile from among a plurality of descriptor tiles included in a reference descriptor map corresponding to a reference image of the plurality of input images;

determining a center target descriptor tile from among a plurality of descriptor tiles included in a target descriptor map corresponding to a target image of the plurality of input images, such that the center target descriptor tile is located at the same position as the reference descriptor tile on a two-dimensional plane;

determining neighboring target descriptor tiles from among the plurality of descriptor tiles included in the target descriptor map, such that the neighboring target descriptor tiles are adjacent to the center target descriptor tile on the two-dimensional plane;

determining similarities between a reference descriptor included in the reference descriptor tile and target descriptors included in the center target descriptor tile and the neighboring target descriptor tiles; and determining a feature point matched to a reference feature point corresponding to the reference descriptor from among target feature points corresponding to the target descriptors based on the similarities.

2. The method of claim 1, wherein generating the feature point map includes:

limiting the number of feature points extracted from each image tile to a maximum tile feature point number.

3. The method of claim 1, wherein generating the feature point map includes:

determining a maximum image feature point number indicating a maximum number of feature points to be extracted from each input image;

determining a maximum tile feature point number by dividing the maximum image feature point number by a number of image tiles; and limiting a number of feature points included in each image tile to the maximum tile feature point number.

4. The method of claim 1, wherein dividing each input image includes:

dividing each input image uniformly such that each image tile in the plurality of image tiles has the same pixel width and height dimensions.

5. The method of claim 1, wherein generating the feature point map includes:

generating each feature point tile of the plurality of feature point tiles such that each feature point tile in the plurality of feature point tiles includes the same number of data bits corresponding to a feature point tile size, and wherein generating the descriptor map includes:

generating each descriptor tile of the plurality of descriptor tiles such that each descriptor tile in the plurality of descriptor tiles includes the same number of data bits corresponding to a descriptor tile size.

6. The method of claim 1, wherein similarity between descriptors is determined independently of a Euclidean distance between feature points, based on positions of descriptor tiles on a two-dimensional plane.

7. The method of claim 6, wherein a position of each descriptor on the two-dimensional plane corresponds to a tile row index and a tile column index of each descriptor tile.

8. The method of claim 1, wherein the plurality of descriptor maps corresponding to the plurality of input images are stored in a memory device, and similarity between descriptors are determined, based on addresses of the memory device in which descriptor tiles of the plurality of descriptor maps are stored.

9. The method of claim 1, wherein a position of each descriptor on the two-dimensional plane corresponds to a tile row index and a tile column index of each descriptor tile, and wherein the center target descriptor and the neighboring descriptor tiles of the target image corresponding to the reference descriptor tile of the input image are determined based on the tile row index and the tile column index.

10. The method of claim 1, wherein a similarity between descriptors corresponds to a Hamming distance between the descriptors.

11. The method of claim 1, further comprising:

sequentially storing the plurality of feature point tiles corresponding to each input image in a memory device from a feature point start address corresponding to each input image by a feature point tile address offset; and sequentially storing the plurality of descriptor tiles corresponding to each input image in the memory device from a descriptor start address corresponding to each input image by a descriptor tile address offset.

12. The method of claim 11, wherein the feature point tile address offset is determined based on a feature point tile size corresponding to a number of data bits included in each feature point tile, and the descriptor tile address offset is determined based on a descriptor tile size corresponding to a number of data bits included in each descriptor tile.

13. The method of claim 11, wherein generating the mapping information includes:

reading out descriptors for determining similarities from the memory device based on a plurality of descriptor start addresses respectively corresponding to the plurality of input images and the descriptor tile address offset.

14. The method of claim 11, wherein generating the mapping information includes:

determining a reference address of a reference descriptor tile included in a reference descriptor map of the plurality of descriptor maps based on a reference descriptor start address corresponding to the reference descriptor map and the descriptor tile address offset;

determining target addresses of a center target descriptor tile and neighboring target descriptor tiles included in a target descriptor map of the plurality of descriptor maps based on a target descriptor start address corresponding to the reference descriptor map and the descriptor tile address offset, such that the center target descriptor tile is located at the same position as the reference descriptor tile on a two-dimensional plane and the neighboring target descriptor tiles are adjacent to the center target descriptor tile on the two-dimensional plane; and reading out the reference descriptor tile, the center target descriptor tile and the neighboring target descriptor tiles from the memory device based on the reference address and the target addresses.

15. The method of claim 14, wherein generating the mapping information further includes:
determining similarities between a reference descriptor included in the reference descriptor tile and target descriptors included in the center target descriptor tile and the neighboring target descriptor tiles; and
determining a feature point matched to a reference feature point corresponding to the reference descriptor from among target feature points corresponding to the target descriptors based on the similarities.

16. The method of claim 1, wherein the descriptors are generated based on at least one of ORB (Oriented FAST (Features from Accelerated Segment Test) and Rotated BRIEF (Binary Robust Independent Elementary Features)), SIFT (Scale-Invariant Feature Transform), SURF (Speeded Up Robust Features) and MSD (Maximal Self-Dissimilarities).

17. A method of matching images, comprising:
dividing each input image of a plurality of input images into a plurality of image tiles;
generating a feature point map by extracting feature points from each image tile in the plurality of image tiles, wherein the feature point map includes a plurality of feature point tiles corresponding to the plurality of image tiles;
generating a descriptor map by generating descriptors of feature points from the feature point map, wherein the descriptor map includes a plurality of descriptor tiles corresponding to the plurality of feature point tiles;
storing a plurality of descriptor maps respectively corresponding to the plurality of input images in a memory device;
reading out descriptors for determining similarities from the memory device based on addresses of descriptor tiles included in descriptor maps corresponding to different input images of the plurality of input images;
determining similarities between the descriptors that are read out; and
generating mapping information containing matching relationships between feature points included in the different input images based on the similarities, wherein generating the mapping information includes:
determining a reference descriptor tile from among a plurality of descriptor tiles included in a reference descriptor map corresponding to a reference image of the plurality of input images;
determining a center target descriptor tile from among a plurality of descriptor tiles included in a target descriptor map corresponding to a target image of the plurality of input images, such that the center target descriptor tile is located at the same position as the reference descriptor tile on a two-dimensional plane;
determining neighboring target descriptor tiles from among the plurality of descriptor tiles included in the target descriptor map, such that the neighboring target descriptor tiles are adjacent to the center target descriptor tile on the two-dimensional plane;
determining similarities between a reference descriptor included in the reference descriptor tile and target descriptors included in the center target descriptor tile and the neighboring target descriptor tiles; and
determining a feature point matched to a reference feature point corresponding to the reference descriptor from among target feature points corresponding to the target descriptors based on the similarities.

18. The method of claim 17, wherein generating the feature point map includes:
limiting a number of feature points extracted from each image tile to a maximum tile feature point number.

19. A data processing device comprising:
a feature point map generator configured to divide each input image of a plurality of input images into a plurality of image tiles and generate a feature point map including a plurality of feature point tiles respectively corresponding to a plurality of image tiles by extracting feature points included in each image tile of a plurality of image tiles;
a descriptor map generator configured to generate a descriptor map including a plurality of descriptor tiles respectively corresponding to the plurality of feature point tiles by generating descriptors of feature points included in the feature point map; and
an image matcher configured to generate mapping information containing matching relationships between feature points included in different input images of the plurality of input images based on a plurality of descriptor maps respectively corresponding to the plurality of input images, wherein generating the mapping information includes:
determining a reference descriptor tile from among a plurality of descriptor tiles included in a reference descriptor map corresponding to a reference image of the plurality of input images;
determining a center target descriptor tile from a target descriptor map corresponding to a target image of the plurality of input images, such that the center target descriptor tile is located at the same position as the reference descriptor tile on a two-dimensional plane;
determining neighboring target descriptor tiles from among the plurality of descriptor tiles included in the target descriptor map, such that the neighboring target descriptor tiles are adjacent to the center target descriptor tile on the two-dimensional plane;
determining similarities between a reference descriptor included in the reference descriptor tile and target descriptors included in the center target descriptor tile and the neighboring target descriptor tiles; and
determining a feature point matched to a reference feature point corresponding to the reference descriptor from among target feature points corresponding to the target descriptors based on the similarities.

* * * * *